United States Patent
Akenine-Moller et al.

(10) Patent No.: US 9,245,324 B2
(45) Date of Patent: Jan. 26, 2016

(54) LOSSY COLOR MERGE FOR MULTI-SAMPLING ANTI-ALIASING COMPRESSION

(71) Applicants: Tomas G. Akenine-Moller, Lund (SE); Thomas A. Piazza, Granite Bay, CA (US); Prasoonkumar Surti, Folsom, CA (US)

(72) Inventors: Tomas G. Akenine-Moller, Lund (SE); Thomas A. Piazza, Granite Bay, CA (US); Prasoonkumar Surti, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 295 days.

(21) Appl. No.: 13/901,117

(22) Filed: May 23, 2013

(65) Prior Publication Data
US 2014/0347385 A1 Nov. 27, 2014

(51) Int. Cl.
*G06T 5/00* (2006.01)
*G06T 11/40* (2006.01)

(52) U.S. Cl.
CPC ............... *G06T 5/002* (2013.01); *G06T 11/40* (2013.01)

(58) Field of Classification Search
CPC ...... G09G 5/02; G09G 5/022; G09G 2340/10; G06T 11/001; G06T 2200/12; G06T 3/403; G06T 15/503; G06F 17/15
See application file for complete search history.

(56) References Cited

U.S. PATENT DOCUMENTS

| 6,614,449 | B1 | 9/2003 | Morein |
| 2006/0103663 | A1 | 5/2006 | Collodi |
| 2006/0250415 | A1 | 11/2006 | Stevenson |
| 2008/0238920 | A1 | 10/2008 | Brown et al. |
| 2010/0277478 | A1 * | 11/2010 | Ihm et al. ............ 345/426 |
| 2014/0333662 | A1 | 11/2014 | Akenine-moller et al. |

OTHER PUBLICATIONS

International Search Report and Written Opinion received for PCT Patent Application No. PCT/US2014/037953, mailed on Sep. 25, 2014, 10 pages.
Walter et al., "Lightcuts: A Scalable Approach to Illumination", ACM SIGGRAPH conference proceedings, 2005, 10 pages.
Young, Peter, "CSAA (Coverage Sampling Antialiasing)", NVIDIA, 2014, 4 pages.

* cited by examiner

*Primary Examiner* — Antonio A Caschera
(74) *Attorney, Agent, or Firm* — Lynch Law Patent Group, PC

(57) ABSTRACT

Techniques related to graphics rendering including lossy color merge for multi-sampling anti-aliasing compression.

25 Claims, 12 Drawing Sheets

LOSSY COLOR MERGE FOR MULTI-SAMPLING ANTI-ALIASING COMPRESSION

BACKGROUND

In general, graphics rendering may generate an image or images from model data using a wide range of computer implemented techniques. In some graphics rendering implementations, multi-sampling anti-aliasing (MSAA) techniques may be used to improve the visual quality of the rendered image(s) using, in some examples, a graphics processor. For example, MSAA techniques may reduce or eliminate jagged edge effects in images and crawling effects in sequence of images. In MSAA, multiple visibility samples, color samples, and/or depth samples may be used per pixel. Such oversampling or super-sampling (e.g., using more than one sample per pixel) and subsequent sample reduction to produce a final image may improve image or video quality. In general, an advantage of MSAA is that although there are multiple samples per pixel, the pixel shader (e.g., a program that provides shading within an image) only needs to be evaluated once per pixel. A common case is 4×MSAA, where there are four samples per pixel (e.g., 4 samples per pixel) as compared to the usual case of one sample per pixel. Other common use cases are 8 samples per pixel (8×MSAA) and 16 samples per pixel (16×MSAA). However, as will be appreciated, the techniques discussed herein may be applied to any number of samples per pixel.

In general, using MSAA requires a color buffer bandwidth increase by a factor of N for N×MSAA. Therefore, compression of MSAA color data may be advantageous. In previous implementations, the colors may be split into N different planes, such that plane 0 is filled first and subsequent planes are used or filled as needed. For example, if all of the samples a pixel are the same color, then that pixel only fills color plane 0. If the samples of a pixel include two colors, planes 0 and 1 are utilized, and, in general, if the samples of a pixel include N colors, planes 0 through N−1 are utilized. Further, if each pixel in a tile of pixels, for example, uses only one color each (though the colors between pixels may be different), then only plane 0 may be used for the tile of pixels. However, if one pixel of the tile includes two colors (for the samples of that pixel), then plane 1 must be used. If more than one (or all) of the pixels use only two colors each, plane 1 is sufficient, but if one (or more) pixels uses three colors, plane 2 must be used, and so on. In such a manner the color planes may be populated as needed based on the samples within each pixel of a tile of pixels.

Further, in general, each color sample within a pixel needs $\log_2(N)$ bits to "point" to a color in the N different planes (e.g., for 4 color planes, 2 pointer bits are needed for each color sample). For example, if two color planes (planes 0 and 1) are used, for each color sample within a pixel, a pointer must be used to indicate the plane on which the color resides for that sample. In the case of 4×MSAA, each sample would need 2 index bits to point to a color being located in one of the (up to) 4 planes. For a tile of 8×4 pixels with 4 samples per pixel, the requirement is 2×8×4×4=256 bits for the index bits.

In general, if a pixel is completely inside a triangle being rendered, then all samples within the pixel will have the same color and the index or pointer bits will all be zeros for that pixel (because they will point to color plane 0 and index bits 00 point to color plane 0, for example). Further, nothing will be stored in the remaining color planes for that pixel as described above. Therefore, in some cases, only plane 0 is needed. Remaining color planes may be used more frequently as the complexity of the geometry being rendering into a tile (e.g., a tile of 8×4 pixels) increases. Tests indicate that higher level color planes are frequently used in some scenes. In general, it may be advantageous to compress color data such that a minimum number of color planes are used to save color buffer bandwidth, for example.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
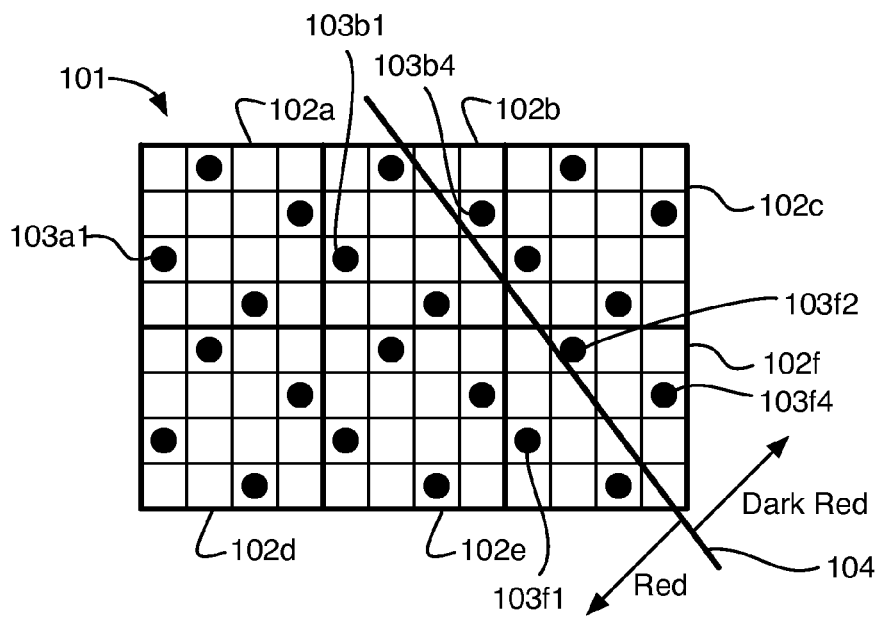
FIG. 1 is an illustrative diagram of an example process for determining colors associated with samples of a pixel.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE)

devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to graphics rendering including lossy color merge for multi-sampling anti-aliasing compression are discussed.

As described above, multi-sampling anti-aliasing (MSAA) techniques may be used to improve the visual quality of rendered images and/or video using a graphics processor, for example. In MSAA, multiple visibility samples, color samples, and/or depth samples may be used per pixel. In some examples, 4×MSAA may be used, where there are four times as many samples per pixel as compared to the usual case of one sample per pixel. Also as discussed, if a pixel is completely inside a triangle being rendered, then all color samples within the pixel will have the same color and only a single color plane (e.g., color plane 0) may be populated for that pixel and nothing will be stored in the remaining color planes for that pixel. In some cases, only plane 0 may be needed for a tile of pixels. Using such a scheme is a generally a type of compression. However, in other cases, additional color planes may typically be used for tiles with pixels having multiple colors for the color samples of the pixel. In such cases, the usage of color buffer bandwidth may increase significantly.

As will be described in greater detail below, two or more colors associated with multiple color samples of a pixel may be determined. For example, two colors associated with four color samples of a pixel may be determined such that the pixel may be a part of a 8×4 tile of pixels. As discussed, two or more colors associated with the color samples may typically require the use of two or more color planes (and a related increase in color buffer bandwidth usage). However, as will be described in greater detail below, it may be determined that two (or more) of colors of the two or more colors are substantially similar and, if the colors are substantially similar, they may be merged to form a merged color. A color plane may be populated with the merged color such that the merged color is associated with the pixel. Using such techniques, the number of colors that need to be stored in a color plane may be reduced for a pixel or pixels of a tile and the population of a color plane or color planes may be eliminated. Therefore such techniques may provide compression.

As will be appreciated, in some instances, the compression may be "lossy" such that some information is lost in the compression. For example, storing the merged color may include less information than storing the colors prior to the merge. Therefore, it may be advantageous to merge the colors only when they are substantially similar, as will be discussed further herein. For example, if the colors are two shades of red, less information may be lost than if the two colors are light blue and dark green, for example and, in some examples, the colors may need to meet a threshold to indicate they are substantially similar such that the compression worthwhile when weighed against the information being lost. By choosing a proper threshold, a balance may be drawn between the advantage of compression when using merged colors versus the advantage of maintaining the color detail when the colors are not merged, for example.

Further, although generally described with respect to MSAA, the techniques discussed herein may be applied to other color representations for tiles of pixels. In general, any technique that may uses multiple samples (e.g., color samples) per pixel may be improved using the techniques discussed herein. For example, if the color samples may be represented using fewer colors (e.g., a merged color or one of the colors only), the described techniques may improve compression performance. In other examples, a tile of pixels may be represented by storing all color planes with full colors. The planes may then each be compressed each plane to as few bytes as possible. In such examples, the described techniques may improve efficiency as compression algorithms generally succeed more often when the colors are the same (e.g., when the colors have been merged as discussed herein FIG. 1 is an illustrative diagram of an example process for determining colors associated with samples of a pixel, arranged in accordance with at least some implementations of the present disclosure. As shown, a tile 101 may include multiple pixels 102*a*-102*f*. In general, a tile may include any number of pixels. In some examples, tile 101 may be 8 pixels wide by 4 pixels high (and may therefore include 32 pixels). In FIG. 1, tile 101 includes 6 pixels (3 pixels wide by 2 pixels high) for the sake of clarity of presentation. As shown, each of pixels 102*a*-102*f* may include color samples 103 such as color sample 103*a*1. In general, each of pixels 102*a*-102*f* may include any number of color samples 103 (e.g., two or more color samples) such as 4 color samples, as shown, and the samples may be considered subpixels, for example. FIG. 1 also illustrates a color boundary 104. Color boundary 104 may be a boundary between two triangles that are being rendered, for example, and, in various examples, color boundary may be an inner boundary (e.g., a boundary between triangles of the same object) or a silhouette boundary (e.g., a boundary between triangles of different objects). In general, the techniques described herein may take advantage of the greater frequency of inner boundaries in graphics rendering. For example, inner boundaries may frequently be between triangles having substantially similar colors. The entirety of the two triangles is not shown for the sake of clarity of presentation. In general, the rendering of the triangles separated by color boundary 104 may be performed by a graphics processing unit based on image data received from a memory store, as is discussed herein. As shown, in the illustrated example, the area to the left of color boundary 104 may be Red and the area to the right of color boundary 104 may be Dark Red.

In general, any number of color boundaries separating any variety of implemented colors may be included in the rendering of a tile such that a large number of combinations of colors for color samples 103 are available. For example, as illustrated at pixel 102*a*, each color sample within a pixel may have the same color (e.g., Red). In other examples, as illustrated at pixel 102*b*, a pixel may include color samples with two colors (e.g., color sample 103*b*1 is Red and color sample 103*b*4 is Dark Red). In further examples, a pixel may have color samples with three colors or four colors (the maximum for the illustrated example) or more (in examples with additional color samples). Further examples include an entire tile having only one color, a tile having different colors across pixels, a tile having different colors across color samples, and so on.

FIG. 1 also illustrates four available color planes 110: color plane 0, color plane 1, color plane 2, and color plane 3. In general, any number of color planes may be used and/or available in the implementations of the techniques discussed herein. In some examples, four color planes may be used with respect to four color samples per pixel. Such implementations may correspond to 4×MSAA techniques, for example. As shown, although some color planes may be available, some may not be used for a given tile (e.g., in FIG. 1, color plane 2 and color plane 3 are available but unused). In general, a color plane that is in use may be described as a populated color plane. As shown, color plane 0 may be first populated with one or more colors. For example, for pixel 102*a*, color plane 0 may be populated with the color associated with color sample 103*a*1 (Red). Similarly, color plane 0 may be populated for the first color samples of pixels 102*b*-*f*. In some examples, color plane 0 may be populated with the furthest left color sample for each pixel although, in general, any location may be used as a first color sample for color plane 0.

As is also shown in FIG. 1, color planes 1, 2, and 3 are not populated for pixel 102*a* since each color sample 103*a* of pixel 102*a* matches the color of color sample 103*a*1 (Red). Similarly, color planes 1, 2, and 3 are not populated for pixels 102*c*, 102*d*, and 102*e* in the given example. For pixel 102*b*, color plane 0 is populated with Red, the color associated with color sample 103*b*1 as shown (Red is also associated with color samples 103*b*2 and 103*b*3, which are not labeled for clarity). Also as shown, color sample 103*b*4 of pixel 102*b* is associated with Dark Red, which is populated in color plane 1. As shown, pixel 102*b* does not require color plane 2 or color plane 3 to be populated (as none of the illustrated pixels do since only two colors and one color boundary 104 are used in the illustrated example). Pixel 102*f* similarly requires populating color planes 0 and 1 for color sample 103*f*1 (Red) and color sample 103*f*2 (Dark Red). Therefore, in the given example, color plane 0 and color plane 1 may be considered populated color planes. As will be appreciated, any number of color planes for any number of samples for any size of tile of pixels may be populated in a similar manner using the described techniques. As will also be appreciated, a wide range of colors, color samples, pixels, and color planes may be available using the described techniques.

FIG. 1 also illustrates bit combinations 105*a*-105*f* associated with pixels 102*a*-102*f* and color samples 103. In general, each bit combination includes index bits 106 as illustrated with respect to bit combination 105*d* having index bits 106*d*1, 106*d*2, 106*d*3, and 106*d*4 (only 106*d*1 is labeled for the sake of clarity of presentation). In general, each of index bits 106 is associated with a color sample 103 such that each of index bits 106 indicates or "points to" a color plane for the associated color sample. In general, the color plane indicated by or pointed to by index bits may be considered an indicated color plane. For example, index bits 106*d*1 (00) indicates color sample 103*d*1 (Red) is in color plane 0 (as shown). Further, for example, index bits 106*f*1 (00) indicates color sample 103*f*1 (Red) is in color plane 0 and index bits 106*f*4 (01) indicates color sample 103*f*4 (Dark Red) is in color plane 1 (also as shown). Although discussed herein with respect to index bits 00 indicating color plane 0, index bits 01 indicating color plane 1, index bits 10 indicating color plane 2, and index bits 11 indicating color plane 3, any suitable bit combinations may be used.

Figure 2:
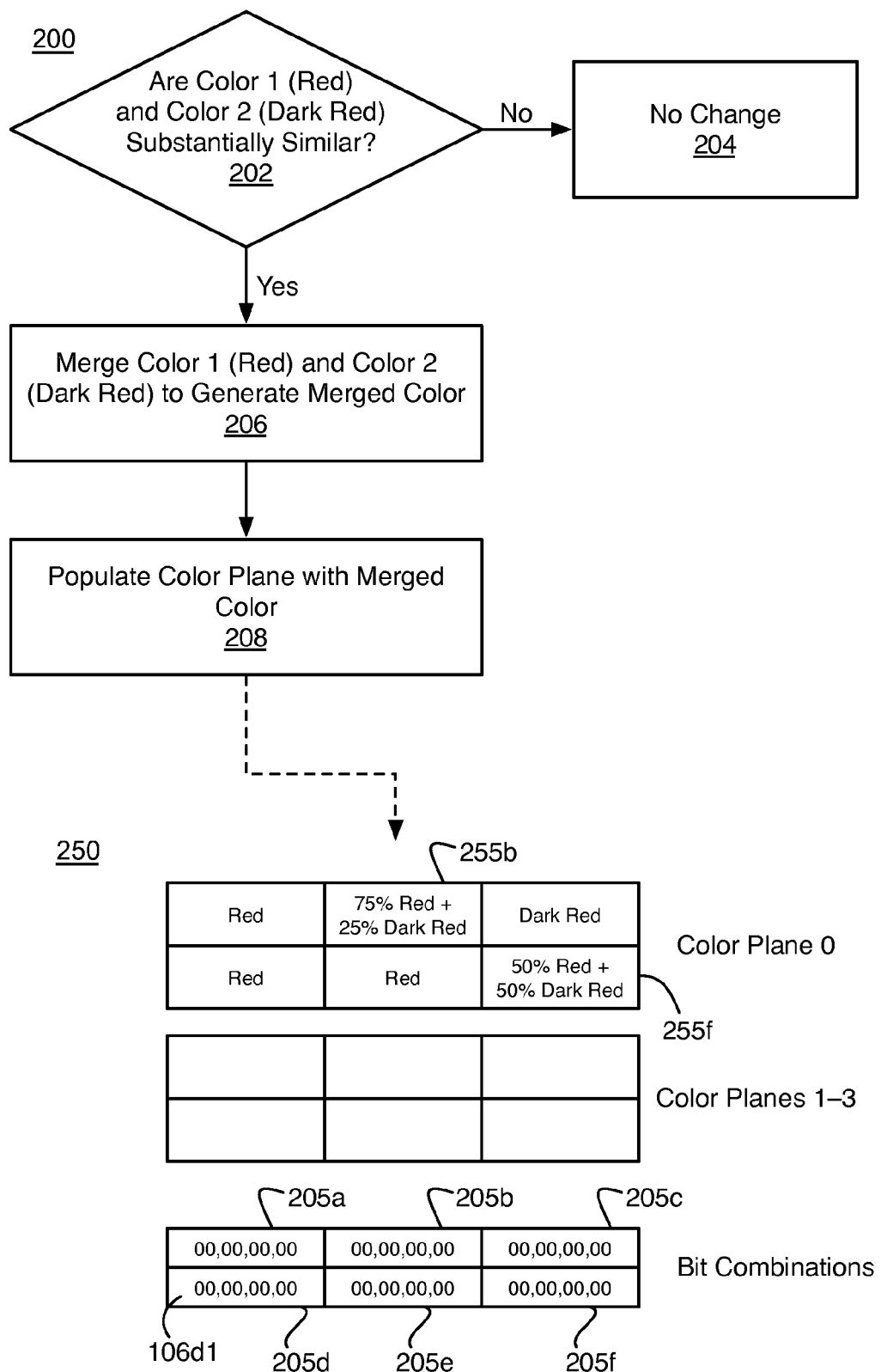
FIG. 2 is an illustrative diagram of an example process for comparing and/or merging colors.

As is described further herein, in general, it may be advantageous to compare and/or merge colors across color planes to thereby eliminate color planes from being populated. Further, based on the comparison and/or merging of colors, the population of color planes 110 and bit combinations 105 may be altered, for example. FIG. 2 is an illustrative diagram of an example process 200 for comparing and/or merging colors, arranged in accordance with at least some implementations of the present disclosure. In general, process 200 may provide or provide a portion of a computer-implemented method for providing anti-aliasing in graphics rendering. In the illustrated implementation, process 200 may include one or more operations, functions or actions as illustrated by one or more of blocks 202, 204, 206 and/or 208, which may generate example results 250. In general, the operations of process 200 may be performed by any suitable module of a computing system, such as, for example, an anti-aliasing compression module of a graphics processing unit, as is discussed further herein.

As shown in FIG. 2, process 200 may begin at decision block 202, "Are Color 1 (Red) and Color 2 (Dark Red) Substantially Similar?", where it may be determined whether a first color (e.g., Color 1) and a second color (e.g., Color 2) are substantially similar. For example, the first color and the second color may be Red and Dark Red in the illustrated example. In general, the first color and the second color may be any colors associated with color samples of a pixel. With reference to FIG. 1, the first color and the second color may be associated with color sample 103*b*1 and 103*b*4, respectively, or 103*f*1 and 103*f*3, respectively, or the like. In the present example, only two colors are available for comparison, however, as is discussed further herein, any number of colors may be compared. In such examples, a variety of techniques may be used to choose and/or compare the colors (e.g., each color may be compared to the other colors, a first color may be chosen and all other colors may be compared to the first color, colors of designated color planes may be compared, or the like).

In general, the determination of whether Color 1 and Color 2 are substantially similar may be performed in any suitable manner such as, for example, by determining a distance between the colors and comparing the distance to a threshold. For example, a distance between two colors may be determined as defined by a distance function (1):

$$d(C_x, C_y) \quad (1)$$

where d may be a distance function that provides a distance between color $C_x$ and color $C_y$. For example, the distance may be determined based on a distance function (1) determining a real distance between colors $C_x$ and $C_y$ in (red green blue) RGB color space, a real distance between colors $C_x$ and $C_y$ in (red green blue alpha) RGBA color space, or a sum of absolute differences between color components of color $C_x$ and $C_y$, or any approximations of the above, or the like.

In some examples, the distance determined by distance function (1) may be compared to a threshold as shown in relationships (2):

$$\text{if } d(C_x, C_y) < t, C_x \text{ and } C_y \text{ are substantially similar,} \quad (2)$$

else $C_x$ and $C_y$ are not substantially similar,
where t may be a threshold. As shown, in some examples, distance, d, may need to be less than threshold, t, for $C_x$ and $C_y$ to qualify as substantially similar while in other examples, distance, d, may need to be less than or equal to threshold, t, for $C_x$ and $C_y$ to qualify as substantially similar. In general, threshold, t, may be determined in any suitable manner. In some examples, the threshold may be predefined. In other examples, the threshold may be heuristically determined or user defined.

In some examples, the threshold may be determined as follows such that the threshold may be made as small as possible to substantially reduce the chance of detecting the merging. For example, Weber's law ("Just Noticeable Difference") proposes that humans cannot detect differences less than about 1% under worst case scenarios with differences of less than about 2% being expected generally. Assuming a color space of about 255 colors, 2% of 255 is 5.10. In some examples, N=2$^n$ samples per pixel may be used (please refer to FIG. 1), such that, in general, a color sum divided by the number of samples would typically be determined over N samples. This is the procedure that happens when everything has been rendered, and the final colors of each pixels are computed (also called resolved). In general, such an operation may be considered a right shift by n, such that about n bits of precision may be lost in the operation. Therefore, about N values out of 255 may be lost which may be calculated as the following percentage lost: 100*N/255%. For N=4 (e.g., an example, associated with 4×MSAA), about 1.56% may be lost via a merger. In general, 2+1.56=3.56% out of 255 may be difficult to detect for 4×MSAA. Based on such evaluations a threshold may be determined as: 0.0356*255=9. Such a threshold would provide difficulty for a human to detect artifacts in the example of 4×MSAA. In other examples, the threshold may be set at 1% or 2% or the like such that the implementation may provide results that may be very difficult for a human to detect (e.g., the resulting images or video may be evaluated objectively as very good by a human). Although described with respect to a specific implementation, the above techniques may be extended to other implementations such as, for example, Nx MSAA (e.g., other values of N), high dynamic range (HDR) imaging, or float buffers, or the like.

As shown in FIG. 2, if it is determined that Color 1 and Color 2 are not substantially similar, process 200 may continue at block 204, "No Change", where no change may be made to the populated color planes and determined bit combinations. For the given example, the populated color planes and determined bit combinations may be determined as shown in FIG. 1 for example. In such examples, process 200 may have determined that the trade-off of greater compression may not have been preferable to the trade-off of greater information in the colors populated in the illustrated color planes.

Further, as shown, if it is determined Color 1 and Color 2 are substantially similar, process 200 may continue at block 206, "Merge Color 1 (Red) and Color 2 (Dark Red) to Generate Merged Color", where the first color (e.g., Color 1) and the second color (e.g., Color 1) may be merged. In general, the colors may be merged in any suitable manner such as, for example, based on the percentages of samples within a pixel having the colors. For example, as shown at results 250, merged color 255b may include 75% Red and 25% Dark Red and merged color 255f may include 50% Red and 50% Dark Red. Referring to FIG. 1, pixel 102b may include color samples 103b such that a subset of color samples 103b have a color Red (i.e., three color samples: 103b1, 103b2, and 103b3) and a subset of color samples 103 have a color Dark Red (i.e., one color sample: 103b4), and hence the merged color would be 0.75*Red+0.25*DarkRed. Similarly, pixel 102f may include color samples 103f such that a subset of color samples 103f have a color Red (i.e., two color samples: 103f1 and 103f3) and a subset of color samples 103 have a color Dark Red (i.e., two color samples: 103f2 and 103f4), and in this case, the merged color would be 0.5*Red+0.5*DarkRed. Such techniques may use a weighted average to determine the merged color, for example. In general, a merged color may be determined as shown in equation (3):

$$C_{merged} = (N \times C_1 + M \times C_2)/(N+M) \quad (3)$$

where $C_{merged}$ may be the merged color, N may be the number of samples in the subset of samples having color $C_1$, and M may be the number of samples in the subset of samples having color $C_2$. As shown in equation (3) and described above, a first subset of color samples may be associated with a first color and a second subset of color samples may be associated with the second color such that the first subset is a first percentage of the color samples and the second subset is a second percentage of the plurality of color samples. In such examples, merging a first color and a second color to form a merged color may include merging the first percentage of the first color and the second percentage of the second color.

As shown, process 200 may continue from block 206 to block 208, "Populate Color Plane with Merged Color", where a color plane may be populated with the merged color. For example, color plane 0 may be populated with merged color 255b. Similarly, color plane 0 may be populated with merged color 255f. Also as shown in FIG. 2, color planes 1-3 may be unpopulated. Further, with reference to FIG. 1, color plane 1 may be newly unpopulated. As described above, by providing an unpopulated color plane 1, substantial color buffer bandwidth savings may be achieved in various computer implementations.

Further, as shown at results 250 of FIG. 2, bit combinations 205 may all be provided as 00,00,00,00, indicating all index bits 106 indicate or point to color plane 0. Therefore, in the illustrative example, the colors associated with color samples 103b of pixel 102 included only two colors (i.e., Red and Dark Red). Further, in the illustrative example, the two colors were determined to be substantially similar at block 202, the colors were merged at block 206 and a color plane 0 was populated at block 208 to provide bit combinations 205. In the illustrative example, the populated color plane is color plane 0 and the described techniques provide for no other color plane to be populated for pixel 102b. Similarly, no other color plane is populated for pixel 102f nor for tile 101. Using such techniques may thereby eliminate color plane 1 from being populated (as indicated by bit combinations 205) and may provide substantial bandwidth savings.

In the given example, the provided results 250 may be substantially similar to the results achieved by populating color planes 110 as shown in FIG. 1 and subsequently merging the colors during down-sampling (e.g., the resolve procedure). However, such similar results may not be achieved in all situations, as is discussed further herein, and, in general, the described techniques may be lossy in that information may be lost upon merging colors. For example, if a triangle is rendered on pixel 102b, there may be a small loss if the rendered triangle covers between one and three of the samples; however, if pixel shading is coherent over an object (except for silhouette edges), this loss may be small.

In general, the example illustrated by FIGS. 1 and 2 provides for a single color boundary, two colors, and four samples per pixel. As is described further herein, a wide range of color boundary combinations, color combinations, and samples per pixel may be implemented using the techniques described herein. In the following examples, beginning with FIG. 3, two color boundaries, three colors, and four samples per pixel are illustrated and described to provide a better understanding of the disclosed techniques. Further, the techniques are further generalized to examples beyond those illustrated herein.

Figure 3:
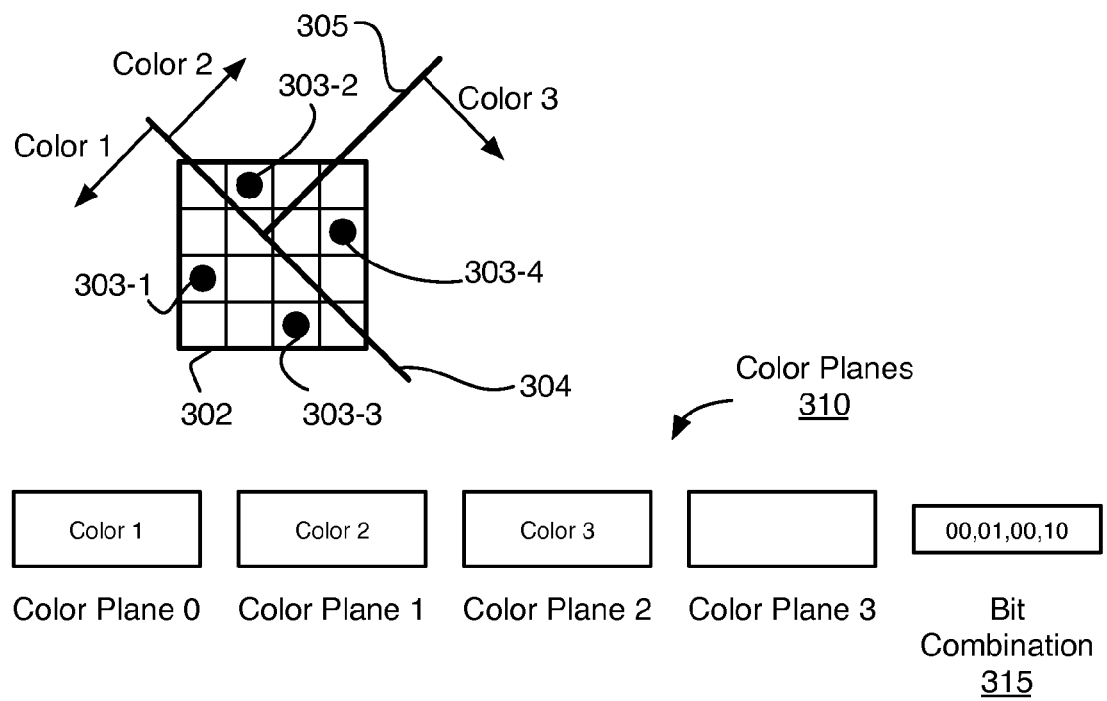
FIG. 3 is an illustrative diagram of an example process for determining colors associated with samples of a pixel.

FIG. 3 is an illustrative diagram of an example process for determining colors associated with samples of a pixel, arranged in accordance with at least some implementations of the present disclosure. As shown, a pixel 302 may include multiple color samples 303, such as 303-1 through 303-4. In various examples, pixel 302 may be a part of a tile of pixels as discussed herein and, in general, pixel 302 may include any number of color samples 303. FIG. 3 also illustrates color boundary 304 and color boundary 305. Color boundaries 304, 305 may be boundaries (e.g., inner or silhouette boundaries) between triangles being rendered, for example. The entirety of the triangles are not shown for the sake of clarity of presentation. In general, the rendering of the triangles may be performed by a graphics processing unit based on image data received from a memory store, as is discussed herein. As shown, in the illustrated example, the area to the left of color boundary 304 may be Color 1, the area to the right of color boundary 304 and above color boundary 305 may be Color 2, and the area to the right of color boundary 305 and above color boundary 304 may be Color 3. As discussed herein, in general, any number of color boundaries separating any variety of implemented colors may be included in the rendering of a tile or pixel such that a large number of combinations of colors are possible.

FIG. 3 also illustrates four available color planes 310: color plane 0, color plane 1, color plane 2, and color plane 3. As discussed, in general, any number of color planes may be used and/or available in the implementations of the techniques discussed herein. In the example of FIG. 3, four color planes may be used with respect to four color samples per pixel. Such implementations may correspond to 4×MSAA techniques, for example. As shown, color plane 0 may be first populated with one or more colors and color planes 1-3 may be subsequently populated as needed. For example, for pixel 302, color plane 0 may be populated with the color associated with color sample 303-1 (Color 1), color plane 1 may be populated with the color associated with color sample 303-2 (Color 2), color plane 0 may be populated with the color associated with color sample 303-1 (Color 1), color plane 2 may be populated with the color associated with color sample 303-4 (Color 3), and color plane 3 may be unpopulated for pixel 302.

Also as shown, a bit combination 315 may be determined for pixel 302. In the illustrated example, bit combination 315 may include index bits 00,01,00,10 associated with color samples 303 and color planes 310 such that first index bits (00) indicate color sample 303-1 indicates or points to color plane 0 (e.g., color sample, 303-1 is associated with Color 1), second index bits (01) indicate color sample 303-2 indicates or points to color plane 1 (e.g., color sample, 303-2 is associated with Color 2), third index bits (00) indicate color sample 303-3 indicates or points to color plane 0 (e.g., color sample, 303-3 is associated with Color 1), and fourth index bits (10) indicate color sample 303-4 indicates or points to color plane 2 (e.g., color sample, 303-4 is associated with Color 3). As will be appreciated, color planes 310 and bit combination 315 may describe an example for pixel 302 such that no change or no color merge or the like has been implemented for pixel 302. In general, for Nx MSAA, there may be 0 to N−1 color planes, N color samples, and k different colors associated with a pixel, with the associated colors forming a set $\{C_k\}$ of colors.

Figure 4:
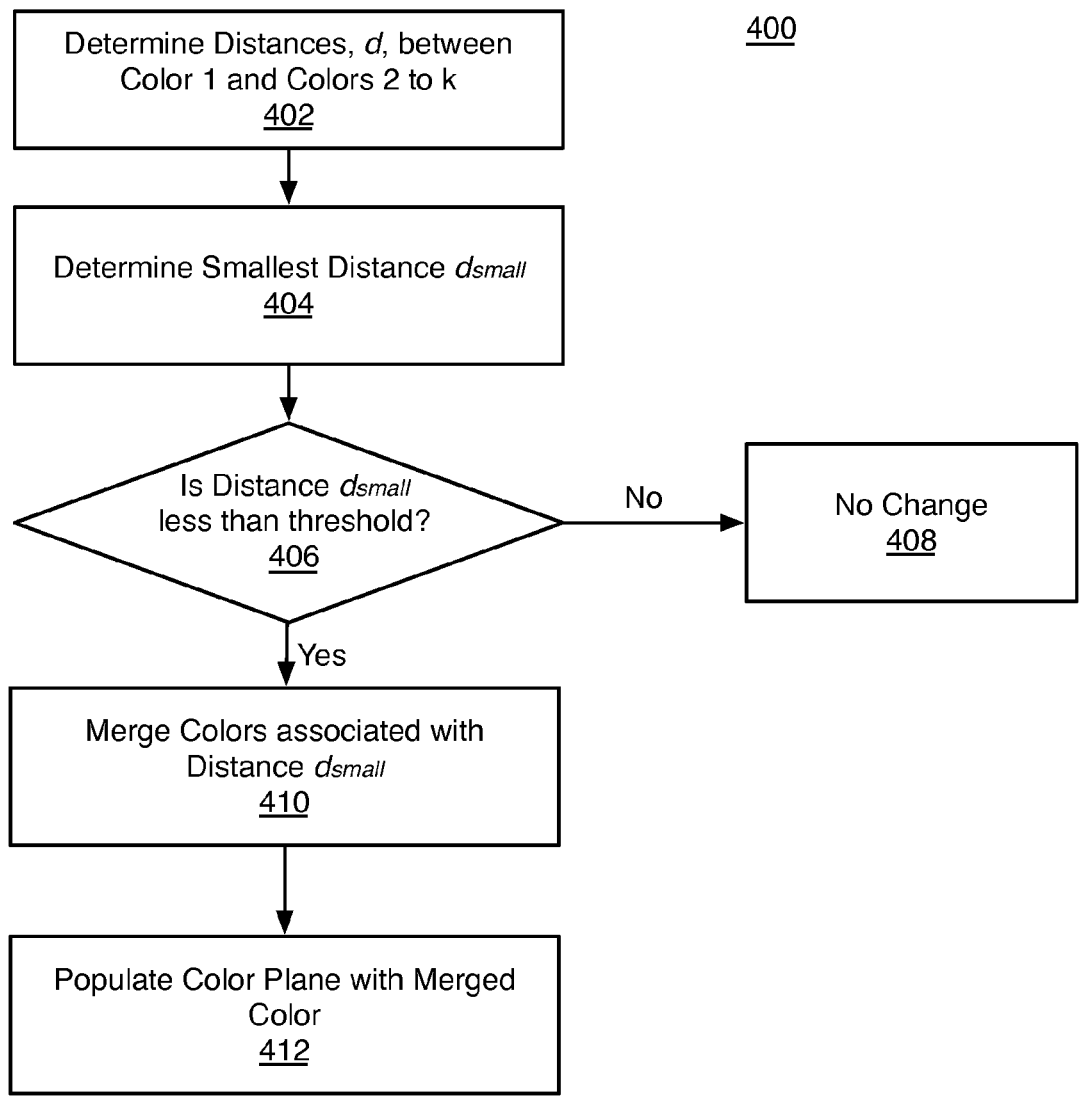
FIG. 4 is an illustrative diagram of an example process for comparing and/or merging colors.
Figure 4:
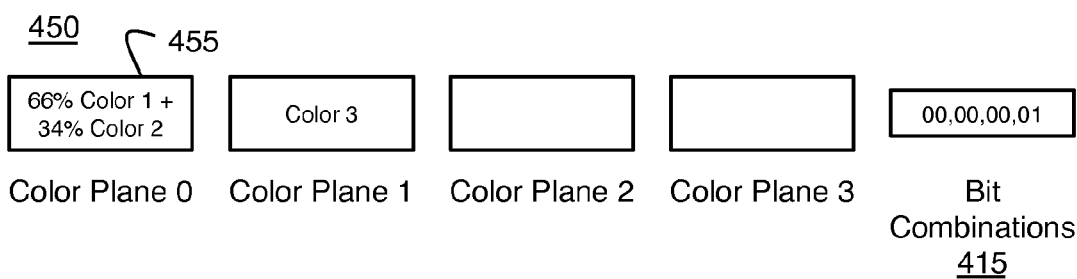

Turning now to FIG. 4, FIG. 4 is an illustrative diagram of an example process 400 for comparing and/or merging colors, arranged in accordance with at least some implementations of the present disclosure. In general, process 400 may provide or provide a portion of a computer-implemented method for providing anti-aliasing in graphics rendering. In the illustrated implementation, process 400 may include one or more operations, functions or actions as illustrated by one or more of blocks 402, 404, 406, 408, 410 and/or 412, which may generate example results 450. In general, the operations of process 400 may be performed by any suitable module of a computing system, such as, for example, an anti-aliasing compression module of a graphics processing unit, as is discussed further herein. The operations of process 400 are described with respect to FIG. 3 and results 450 however the example is only illustrative and the described techniques are not limited to such examples.

Process 400 may begin at block 402, "Determine Distances, d, between Color 1 and Colors 2 to k", wherein a first color and each of the other colors (e.g., colors 2 to k) may be compared to determine distances between the first color and each of the other colors. Such distances may be determine as described above with respect to equation (1), for example. As shown, the distances may be determined between a first color and each of the other colors in some examples. The first color may be associated with a first color sample (e.g., color sample 303-1), the first color may be the color having the most associated color samples of a pixel, or the first color may be associated with a triangle currently being rendered (e.g., color $C_{tri}$), or the like. In such instances, the first color may be a triangle color or a base color, or an arbitrary color computed by a program, or the like. Color 2 may be any of the colors not being overwritten by the triangle currently being rendered. In other examples, distances may be determined between all of the colors (e.g., distances $d_{ij}$ may be determined, where i and j are counter variables that count through all colors; as will be appreciated distances $d_{ii}$ and $d_{jj}$ may not be needed in such implementations), i.e., all distances, $d_{ij}$, such i<j, are computed. In either case, process 400 may continue from block 402 to block 404, "Determine Smallest Distance $d_{small}$", where a smallest distance of the distances may be determined using any suitable technique.

Process 400 may continue from block 404 to decision block 406, "Is Distance $d_{small}$ less than threshold?", where it may be determined whether $d_{small}$ is less than a threshold as discussed above with respect to relationship (2). If it is determined that distance $d_{small}$ is not less than the threshold (e.g., that the colors associated with distance $d_{small}$ are not substantially similar), process 400 may continue at block 408, "No Change", where no change may be made to the populated color planes and determined bit combinations. For the given example, the populated color planes and determined bit combinations may be determined as shown in FIG. 3, for example. If it is determined that distance $d_{small}$ is less than (or less than or equal to in some examples) the threshold (e.g., that the colors associated with distance $d_{small}$ are substantially similar), process 400 may continue at block 410, "Merge Colors associated with Distance $d_{small}$", where the colors associated with $d_{small}$ may be merged as discussed with respect to equation (3) above.

Process 400 may continue from block 410 to block 412, "Populate Color Plane with Merged Color", where a color plane may be populated with the merged color. In the illustrated example, it is assumed that Color 1 and Color 2 (please refer to FIG. 3) are associated with distance $d_{small}$ and that distance $d_{small}$ satisfies the given threshold. In such examples, Color 1 and Color 2 may be merged based on equation (3) to provide merged color 455, which may be populated in color plane 0. Further, in the given example, since a third (unmerged color), Color 3 is associated with a color sample of pixel 302 (e.g., color sample 303-4), Color 3 is populated in color plane 1. Comparing now, the result of FIG. 3 with result 450, it can be seen that color plane 2 is unpopulated for pixel 302 in the example. As will be appreciated, color plane 2 may be unpopulated for a pixel or tile using such techniques.

Further, FIG. 4 illustrates bit combinations 415 associated with the populated color planes of results 450. FIG. 4 illustrates, for example, that determining first color and second color are substantially similar may include comparing the first color to each of the other colors of multiple colors to determine a distances associated with each of the other colors (e.g., distances from the first color) and that a potential merge may be made of the first color and the other color associated with a minimum distance. In some examples, such a merge may be subject to the minimum distance being less than a threshold. As discussed, in other examples, the minimum distance may be based on a comparison of the distances between all possible combinations of colors or the like. Further, while FIG. 2 illustrated the discussed techniques may depopulate all color planes other than a single color plane (e.g., color plane 0), the example of FIG. 4 illustrates that in some examples the discussed techniques may depopulate a higher level color plane (e.g., color plane 2 or 3 or the like).

Figure 5:
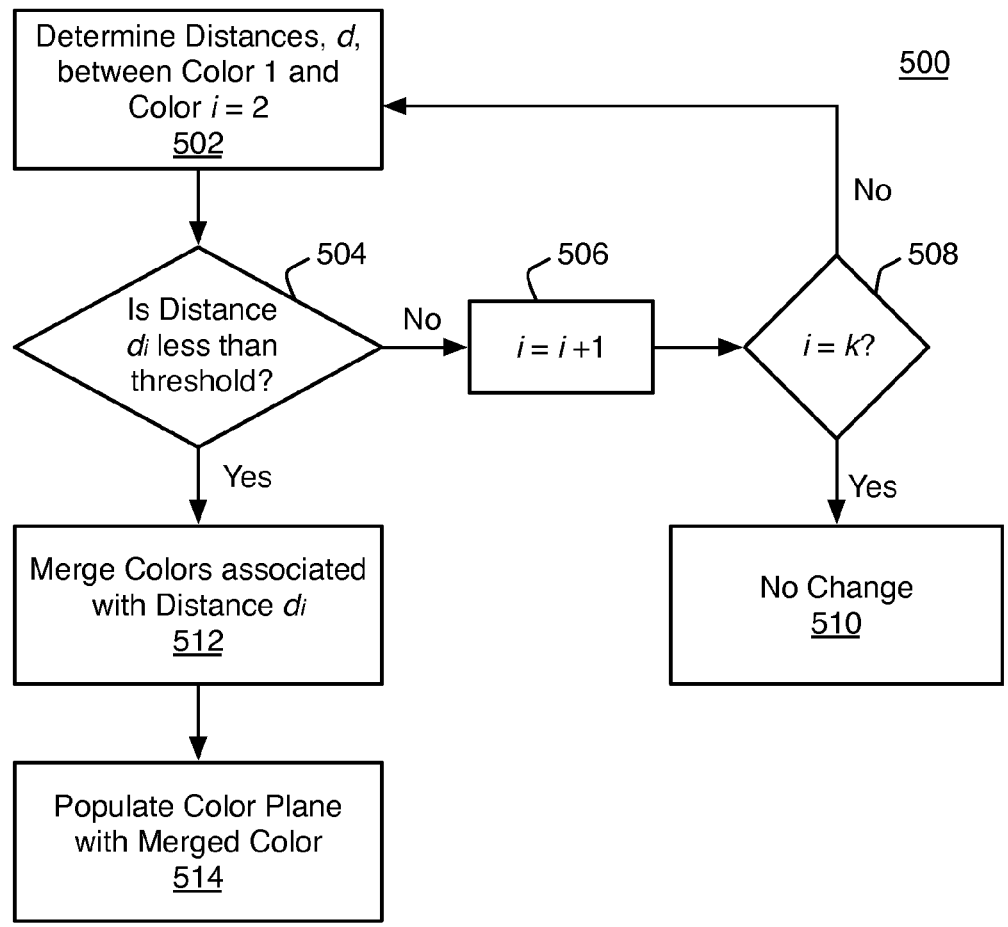
FIG. 5 is an illustrative diagram of an example process for comparing and/or merging colors.
Figure 5:
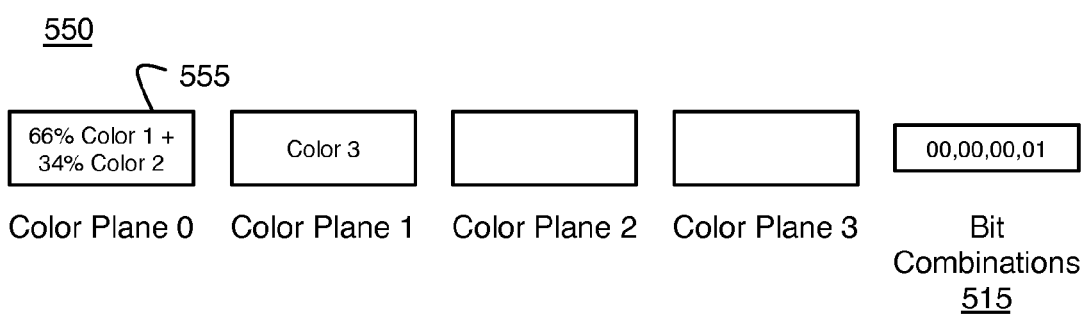

Turning now to FIG. 5, FIG. 5 is an illustrative diagram of an example process 500 for comparing and/or merging colors, arranged in accordance with at least some implementations of the present disclosure. In general, process 500 may provide or provide a portion of a computer-implemented method for providing anti-aliasing in graphics rendering. In the illustrated implementation, process 500 may include one or more operations, functions or actions as illustrated by one or more of blocks 502, 504, 506, 508, 510, 512, and/or 514, which may generate example results 550. In general, the operations of process 500 may be performed by any suitable module of a computing system, such as, for example, an anti-aliasing compression module of a graphics processing unit, as is discussed further herein. The operations of process 500 are described with respect to FIG. 3 and results 550 however the example is only illustrative and the described techniques are not limited to such examples.

Process 500 may begin at block 502, "Determine Distances, d, between Color 1 and Color i=2", wherein a first color (color 1) and a second color (colors 2) may be compared to determine distances between the first color and the second color. In some examples, the first color may be the color of a triangle currently being rendered and the second color may be any of the colors not being overwritten by the triangle currently being rendered. In general, the distance may be determined as described above with respect to equation (1), for example. As shown, the distances may be determined between a first color and a second color. The first color may be associated with a first color sample (e.g., color sample 303-1) and the second color may be associated with a first color sample (e.g., color sample 303-2), for example, such that the color evaluation described with respect to process 500 may be performed in an order matching an order of color samples of a pixel.

Process 500 may continue from block 502 to decision block 504, "Is Distance $d_i$ less than threshold?", where it may be determined whether distance $d_i$ is less than a threshold as discussed above with respect to relationship (2). If it is determined that distance $d_i$ is not less than the threshold (e.g., that the colors associated with distance $d_i$ are not substantially similar), process 500 may continue at block 506, "i=i+1", where i may be advanced by one (e.g., i may be a counter variable that counts from 2 to k where k may be maximum number of colors to be evaluated) and to block 508, "i=k?", where it may be determined if the last color, k, has been evaluated. If the last color has been evaluated (and no substantially similar color has been determined), process 500 may continue at block 510, "No Change", where no change may be made to the populated color planes and determined bit combinations. For the given example, the populated color planes and determined bit combinations may be determined as shown in FIG. 3, for example. If the last color is not being evaluated (e.g., i does not equal k), process 500 may continue at block 502 as described.

If it is determined that distance $d_i$ (e.g., for any i) is less than (or less than or equal to in some examples) the threshold (e.g., that color 1 and color i are substantially similar), process 500 may continue at block 512, "Merge Colors associated with Distance $d_i$", color 1 and color i may be merged as discussed with respect to equation (3) above. Process 500 may continue from block 512 to block 514, "Populate Color Plane with Merged Color", where a color plane may be populated with the merged color. In the illustrated example, it is assumed that Color 1 and Color 2 (please refer to FIG. 3) are associated with distance $d_i$. In such examples, Color 1 and Color 2 may be merged based on equation (3) to provide merged color 555, which may be populated in color plane 0. Further, in the given example, since a third (unmerged color), Color 3 is associated with a color sample of pixel 302 (e.g., color sample 303-4), Color 3 is populated in color plane 1. Comparing now, the result of FIG. 3 with result 550, it can be seen that color plane 2 is unpopulated for pixel 302 in the example. As will be appreciated, color plane 2 may be unpopulated for a pixel or tile using such techniques.

Further, FIG. 5 illustrates bit combinations 515 associated with the populated color planes of results 550. FIG. 5 illustrates, for example, that determining a first color and another color are substantially similar may include comparing a first color to each of the other colors in order such that when a distance associated with the first color and another color is less than a threshold, the colors may be merged. It is noted that in some examples, a shorter distance (e.g., better color match) may be missed since process 500 accepts the first instance of colors that are substantially similar. Such a technique may provide ease of implementation and speed at the expense of missing a better color match.

Figure 6:
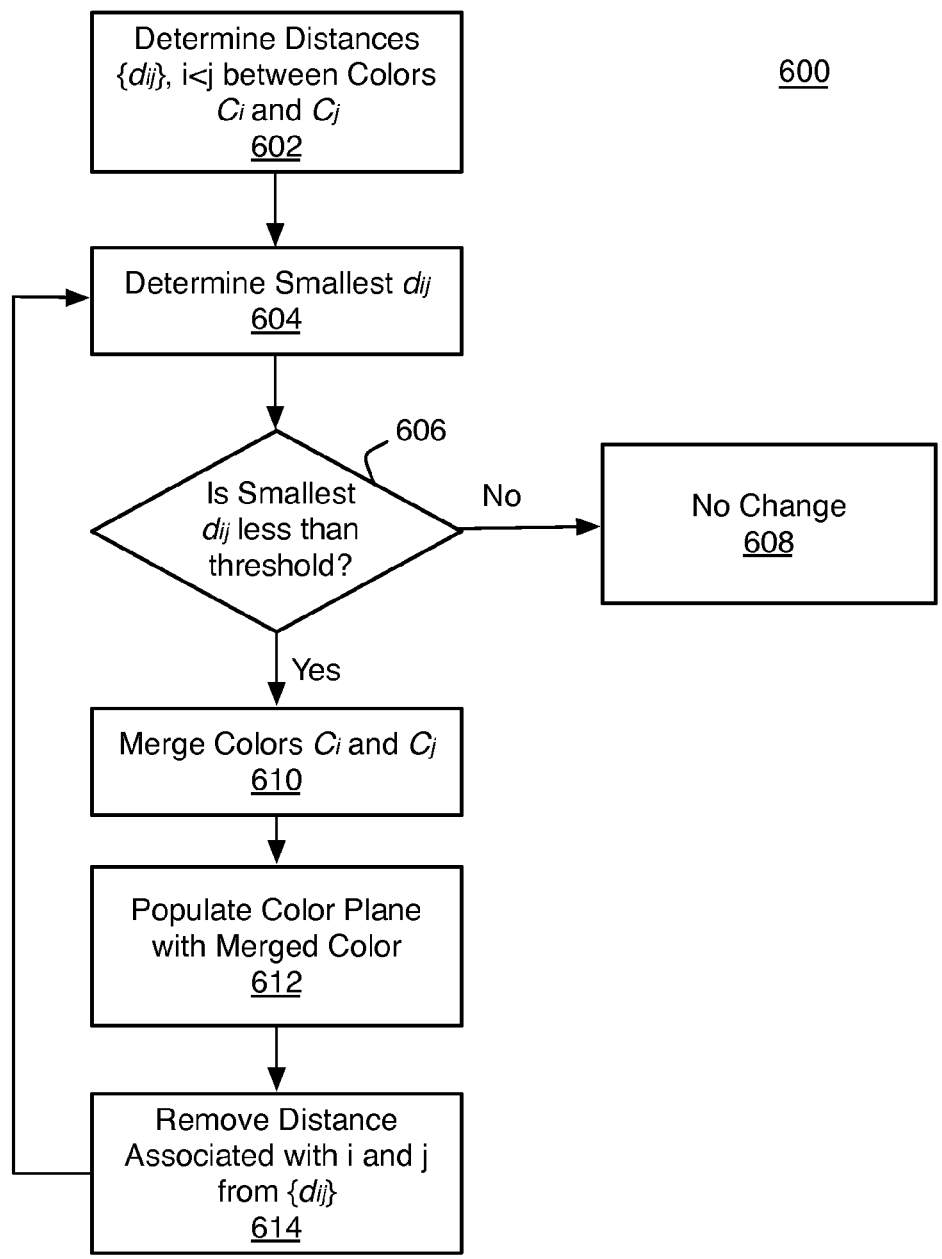
FIG. 6 is an illustrative diagram of an example process for comparing and/or merging colors.
Figure 6:
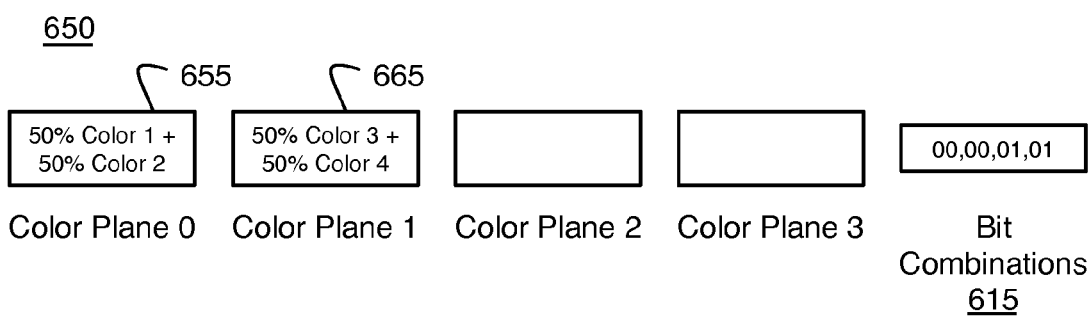

As discussed, in other examples, the minimum distance may be based on a comparison of the distances between all possible combinations of colors or the like. FIG. 6 is an illustrative diagram of an example process 600 for comparing and/or merging colors, arranged in accordance with at least some implementations of the present disclosure. In general, process 600 may provide or provide a portion of a computer-implemented method for providing anti-aliasing in graphics rendering. In the illustrated implementation, process 600 may include one or more operations, functions or actions as illustrated by one or more of blocks 602, 604, 606, 608, 610, 612, and/or 614, which may generate example results 650. In general, the operations of process 600 may be performed by any suitable module of a computing system, such as, for example, an anti-aliasing compression module of a graphics processing unit, as is discussed further herein. The operations of process 600 are described with respect to FIG. 3 and results 650 however the example is only illustrative and the described techniques are not limited to such examples.

The examples of process 600 may provide a technique for comparing the colors between all possible combinations of colors and may be considered a generalized example. Process 600 may begin at decision block 602, "Determine Distances $\{d_{ij}\}$, i<j between Colors Ci and Cj", where a set of distances may be determined between all of the possible combinations of colors. In general, the distances may be determined as described above with respect to equation (1), for example. As shown, the distances may be determined between all possible color combinations.

Process 600 may continue from block 602 to decision block 604, "Determine Smallest $d_{ij}$", where the smallest distance among the set $\{d_{ij}\}$ may be determined. For example, the smallest distance among the set $\{d_{ij}\}$ may indicate color $C_i$ and color $C_j$ are the closest among all of the possible color combinations. whether distance $d_i$ is less than a threshold as discussed above with respect to relationship (2).

Process 600 may continue from block 604 to decision block 606, "Is Smallest $d_{ij}$ less than threshold?", where it may be determined whether distance the smallest $d_{ij}$ is less than a threshold as discussed above with respect to relationship (2). If it is determined that the smallest $d_{ij}$ is not less than the threshold (e.g., that the colors associated with distance $d_i$ are not substantially similar), process 600 may continue at block 608, "No Change", where no change may be made to the populated color planes and determined bit combinations.

If it is determined that the smallest $d_{ij}$ is less than (or less than or equal to in some examples) the threshold (e.g., color $C_i$ and color $C_j$ are substantially similar), process 600 may continue at block 610, "Merge Colors Ci and Cj", where color $C_i$ and color $C_j$ may be merged as discussed with respect to equation (3) above. Process 600 may continue from block 610 to block 612, "Populate Color Plane with Merged Color", where a color plane may be populated with the merged color. In the illustrated example, it is assumed that color $C_i$ and color $C_j$ are associated with distance $d_{ij}$ and that color $C_i$ and color $C_j$ are Color 1 and Color and, furthermore, that they are substantially similar. In such examples, color $C_i$ and color $C_j$ may be merged based on equation (3) to provide merged color 655, which may be populated in color plane 0.

Figure 7:
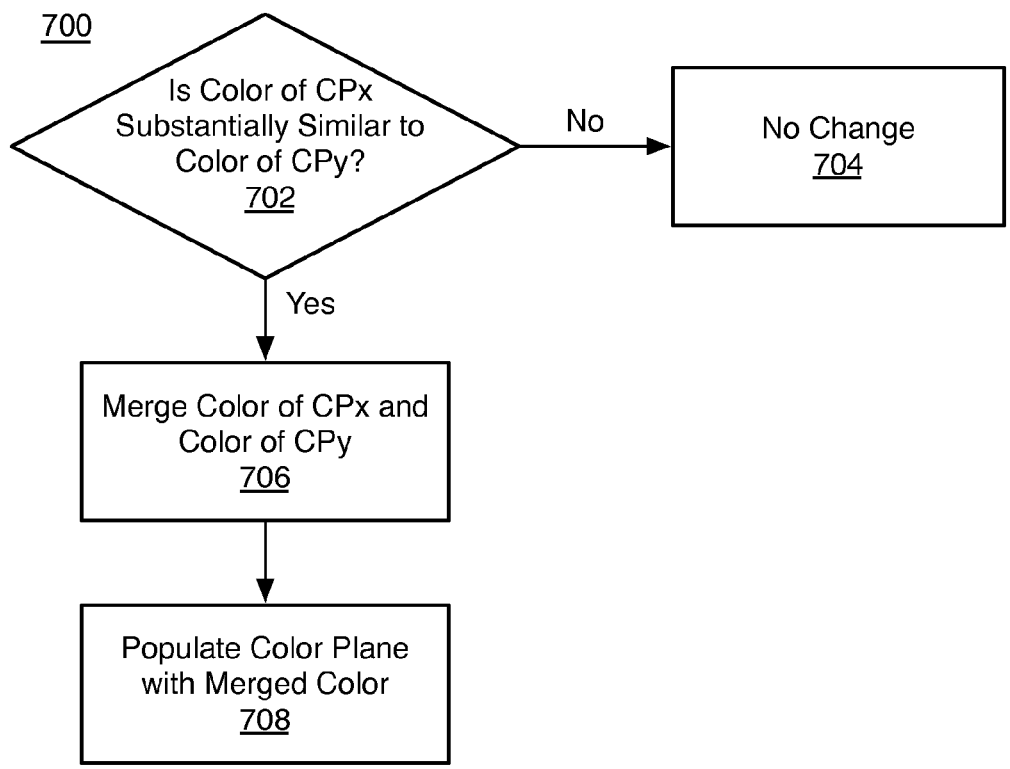
FIG. 7 is an illustrative diagram of an example process for comparing and/or merging colors.
Figure 7:
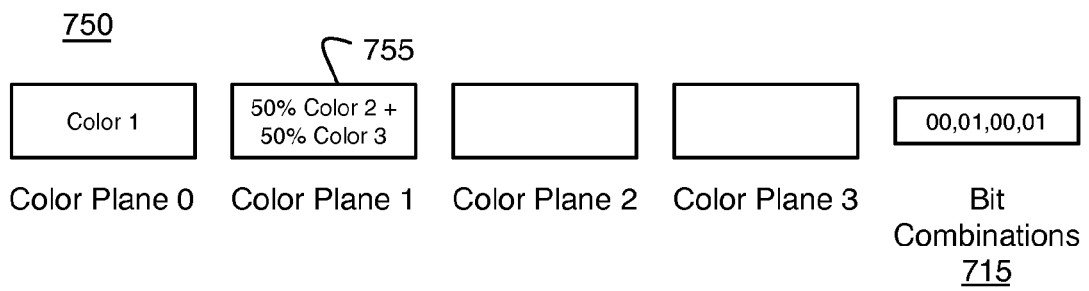

Process 600 may continue at block 614, "Remove Distance Associated with i and j from $\{dij\}$", where the distance associated with i and j may be removed from the set $\{d_{ij}\}$. As shown, process 600 may continue at block 604, where, again, the smallest distance among the set $\{d_{ij}\}$ (with the previous smallest distance) may be determined. As shown, process 600 may continue through the previously described operations until a smallest distance does not meet the threshold and process 600 may end at operation 608. Otherwise, substantially similar colors may be merged and populated into color planes so long as the threshold is met. In the shown example, it is assumed that a Color 3 is substantially similar with a Color 4 such that a merged Color 3 and Color 4 may be populated in color plane 1 as merged color 665. Please note, no example tile of pixels and pixel samples is provide herein for example results 650. Further, FIG. 7 illustrates bit combinations 715 associated with the populated color planes of results 750. FIG. 7 illustrates, for example, that pre-specified or heuristically determined color planes may be evaluated to determine if their colors may be merge. Such a technique may provide ease of implementation and substantial bandwidth saving as discussed herein.

Further, FIG. 6 illustrates bit combinations 615 associated with the populated color planes of results 650. Although no illustrative example of the scenario of FIG. 6 is given herein, bit combinations 615 assume a first and second sample have been merged and stored in color plane 0 and a third and fourth sample have been merged and stored in color plane 1.

Turning now to FIG. 7, FIG. 7 is an illustrative diagram of an example process 700 for comparing and/or merging colors, arranged in accordance with at least some implementations of the present disclosure. In general, process 700 may provide or provide a portion of a computer-implemented method for providing anti-aliasing in graphics rendering. In the illustrated implementation, process 700 may include one or more operations, functions or actions as illustrated by one or more of blocks 702, 704, 706, and/or 708, which may generate example results 750. In general, the operations of process 700 may be performed by any suitable module of a computing system, such as, for example, an anti-aliasing compression module of a graphics processing unit, as is discussed further herein. The operations of process 700 are described with respect to FIG. 3 and results 750 however the example is only illustrative and the described techniques are not limited to such examples.

The examples of process 700 may provide a technique for comparing the colors between chosen color planes. In general, the chosen color planes may be any color planes. For example, the chosen color planes may be the two highest level color planes or the two lowest level color planes, or the like. Further, process 700 may be repeated for any number of chosen color planes. Process 700 may begin at decision block 702, "Is Color of CPx Substantially Similar to Color of CPy?", where it may be determined whether the color of color plane x is substantially similar to the color of color plane y. For example, a distance between the colors may be determined and the distance may be compared to a threshold as discussed herein. As discussed x and y may refer to any color planes such as, for example color plane 0 and 1 or color plane y, where y is the highest populated plane and x where x=y−1, for example.

If it is determined that distance the colors are not substantially similar, process 700 may continue at block 704, "No Change", where no change may be made to the populated color planes and determined bit combinations. For the given example, the populated color planes and determined bit combinations may be determined as shown in FIG. 3, for example. As discussed, in some examples, process 700 may be repeated for other color planes.

If it is determined that the colors are not substantially similar (e.g., that a distance determined for the color of color plane x and the color of color plane y is less than a threshold), process 700 may continue at block 706, "Merge Color of CPx and Color of CPy", the color of color plane x and the color of color plane y may be merged as discussed with respect to equation (3) above. Process 700 may continue from block 706 to block 708, "Populate Color Plane with Merged Color", where a color plane may be populated with the merged color. In the illustrated example, it is assumed that the color of color plane 1 (e.g., Color 2) and the color of color plane 2 (e.g., Color 3) are being compared and that the distance between them is less than the threshold. As such, merged color 755 may be generated (at block 706) and color plane 1 may be populated (at block 708) as illustrated. Comparing now, the result of FIG. 3 with result 750, it can be seen that color plane 2 is unpopulated for pixel 302 in the example. As will be appreciated, color plane 2 may be unpopulated for a pixel or tile using such techniques.

Further, FIG. 7 illustrates bit combinations 715 associated with the populated color planes of results 750. FIG. 7 illustrates, for example, that pre-specified or heuristically determined color planes may be evaluated to determine if their colors may be merge. Such a technique may provide ease of implementation and substantial bandwidth saving as discussed herein.

As discussed, colors may be merged to generate a merged color, which may be populated into a color plane. Also as discussed, the merged color may be populated into a color plane such that color plane may be depopulated, which may lead to substantial bandwidth savings. In general, the described merged colors have included merging two colors, however the described techniques are not limited to two colors. In general, any number of colors may be merged such as, for example, three or four colors or more. The above techniques may generally be extended to additional colors. For example, the multiple colors may all be substantially similar (e.g., the distances between each of them or an average distance among them) may be below a threshold or the like. Further, equation (3) may be easily extended to include multiple colors such that a weighted average may be applied to multiple colors. Similarly, the techniques of processes 400, 500, 600, or 700 may be extended to multiple colors. For process 400, any qualifying colors may be merged, for example. For process 500, a first multiple (e.g., three or four or more) qualifying colors may be merged, for example. For process 700, multiple color planes may be evaluated for merging, for example.

In some examples, it may be determined that three colors are substantially similar and the three colors (e.g., a first, second and third colors) may be merged based on a weighted average to form a merged color. The merged color may be populated into a color plane as discussed herein. In other examples, a merged color (e.g., a merged color based on a first and second color) may be compared to a third color and, if the merged color and the third color are substantially similar, merged color may be merged with the third color to form a modified merged color. The modified merged color may be populated into a color plane as discussed herein.

Further, in some examples, other data associated with the samples (i.e., data other than color data) may be used to determine whether colors should be merged. For example, depth data may be used. In some examples a depth associated with the sample of color and another depth associated with the sample of another color (e.g., a color being evaluated for merger) may be evaluated. The depths may be compared (e.g., a difference between the depths may be determined). If the difference is less than a depth threshold, the colors may be merged (assuming the colors meet other criteria as discussed such as being substantially similar or the like). In such examples, two colors may be merged only if the distance between the colors are substantially close and the depth(s) of the sample(s) of the triangle being rendered are substantially close to the depth(s) of the other color's samples. As discussed, in some examples, depth data may be used. In other examples, visibility data may be used.

In other examples, assuming two triangles are rendered such that the triangles share a triangle edge. In such examples, it is often the case that colors over the shared edge may be substantially similar (in particular over inner edges—as opposed to silhouette edge—as discussed herein) and the colors over the shared edge may be merged without any image degradation. Therefore, in some implementations, colors over triangle edges may always be merged. In some implementations, colors over inner triangle edges may always be merged. Such techniques may be combined with the other merging techniques as discussed herein. our system may choose to always merge the colors generated over a triangle edge in some embodiment, and then possibly continue using the merging strategies discussed above.

Furthermore, filtering (or merging) neighboring samples may allow an entire seam of two abutting triangles to be contained in a single color plane. Given that these abutting triangles may be rasterized and/or shaded in a narrow temporal window, a render cache (i.e., a color buffer cache) may effectively avoid partial writes for such accesses. For example, without this lossy merge, plane 0 and clear pixels would be written out as partial lines in plane 0 and plane 1. By storing a seam of two abutting triangles in a single color plane, the cache (e.g., the render cache) may be better exploited such that performance may be increased and/or power usage may be reduced.

As will be discussed in greater detail below, a system, such as a computer-implemented system may be used to perform some or all of the various operations discussed herein in connection with FIGS. 1-7.

Figure 8:
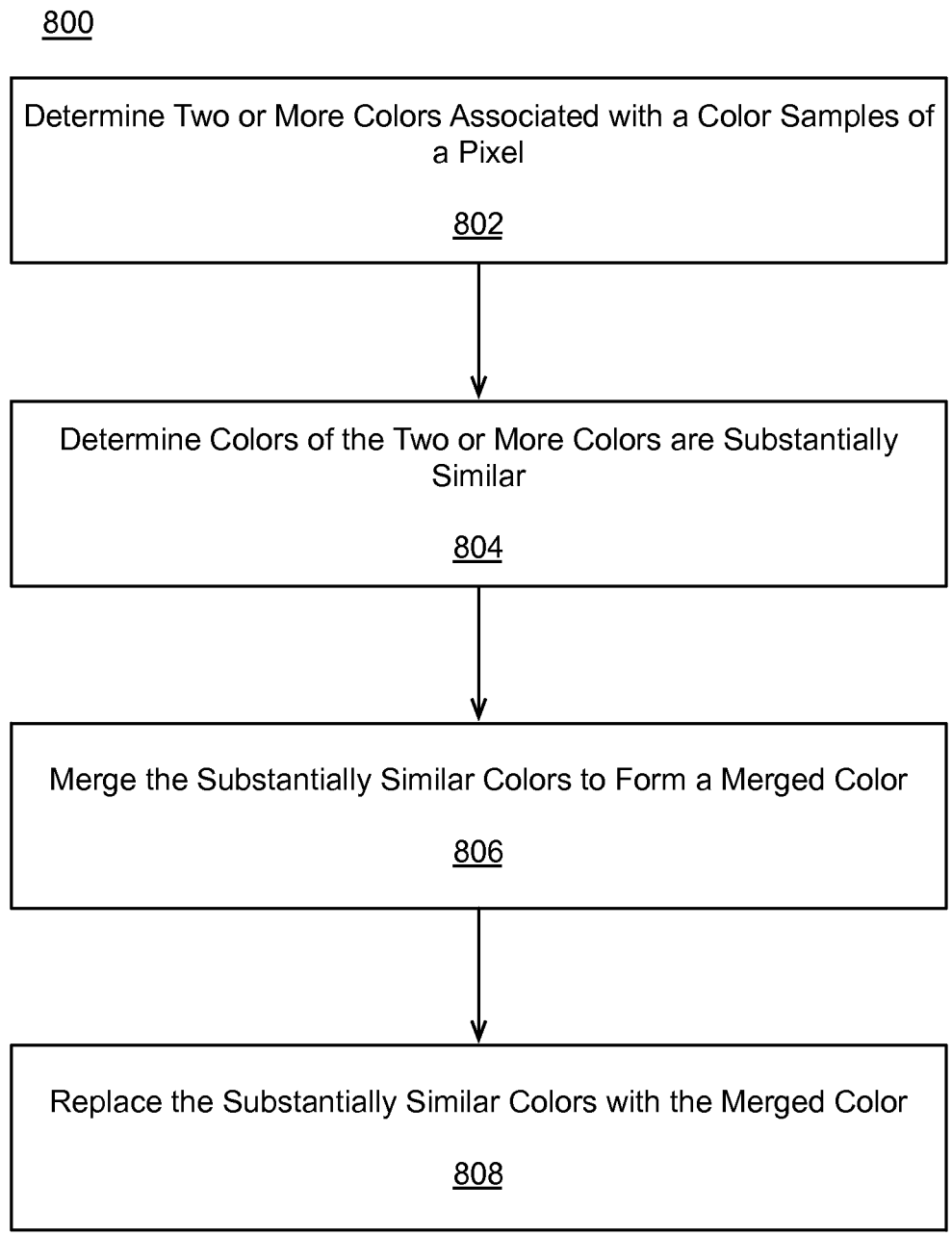
FIG. 8 is a flow chart illustrating an example graphics rendering process.

FIG. 8 is a flow chart illustrating an example process 800, arranged in accordance with at least some implementations of the present disclosure. In general, process 800 may provide a computer-implemented method for providing anti-aliasing in graphics rendering. In the illustrated implementation, process 800 may include one or more operations, functions or actions as illustrated by one or more of blocks 802, 804, 806 and/or 808. By way of non-limiting example, process 800 will be described herein with reference to operations discussed with respect to FIGS. 1-7 above and example system 100 discussed further below.

Process 800 may be utilized as a computer-implemented method for providing anti-aliasing in graphics rendering. Process 800 may begin at block 802, "Determine Two or More Colors Associated with a Color Samples of a Pixel", where two or more colors associated with a plurality of color samples of a pixel may be determined Colors associated with color samples 303-1 through 303-4 of pixel 302 may be determined for example. The colors may be determined by an anti-aliasing compression module 935 of a graphics processing unit or units 830, as is discussed further below. For example, individual pixels may include two or more color samples within the individual pixels and the determined colors may be associated with the two or more color samples, as discussed above.

Processing may continue from operation 802 to operation 804, "Determine Colors of the Two or More Colors are Substantially Similar", where it may be determined that a first color of the two or more colors and a second color of the two or more colors may be substantially similar. For example, the determination that the colors may be substantially similar may be based on a distance between the colors and comparison of the distance to a threshold, as discussed above. In some examples, the determination that the colors may be substantially similar may include evaluation multiple color distances (associated with distances between a first color and other colors or between every combination of colors or the like). In some examples, the determination that the colors may be substantially similar may include using a first qualifying color combination to be used as the substantially similar color combination. In yet other examples, determination that the colors may be substantially similar may include evaluating colors between designated color planes. Further as discussed herein, in some examples, the substantially similar colors may include two colors while in other examples, the substantially similar colors may include more than two colors. The determination may be performed by anti-aliasing compression module 935 of graphics processing unit or units 830, as is discussed further below.

Processing may continue from operation 804 to operation 806, "Merge the Substantially Similar Colors to Form a Merged Color", where the substantially similar colors (e.g., the first color and the second color) may be merged to form a merged color. The substantially similar colors may be merged as described with respect to equation (3) and weighted averaging techniques as discussed herein. The merging may be performed by anti-aliasing compression module 935 of graphics processing unit or units 830, as is discussed further below.

Processing may continue from operation 806 to operation 808, "Replace the Substantially Similar Colors with the Merged Color", where the substantially similar colors may be replaced with the merged color. For example, merged color 255$b$, 255$f$, 455, 555, or 655, may replace substantially similar colors as described herein. The replacement may be performed by anti-aliasing compression module 935 of graphics processing unit or units 830, as is discussed further below.

In some examples, processing may continue (not shown) with populating a color plane with the merged color such that the merged color is associated with the pixel. For example, a color plane may be populated with merged color 255$b$, 255$f$, 455, 555, or 655, as described above. Populating the color plane may be performed by anti-aliasing compression module 935 of graphics processing unit or units 830, as is discussed further below.

Some additional and/or alternative details related to process 800 may be illustrated in one or more examples of implementations discussed in greater detail below with regard to FIG. 9.

Figure 9:
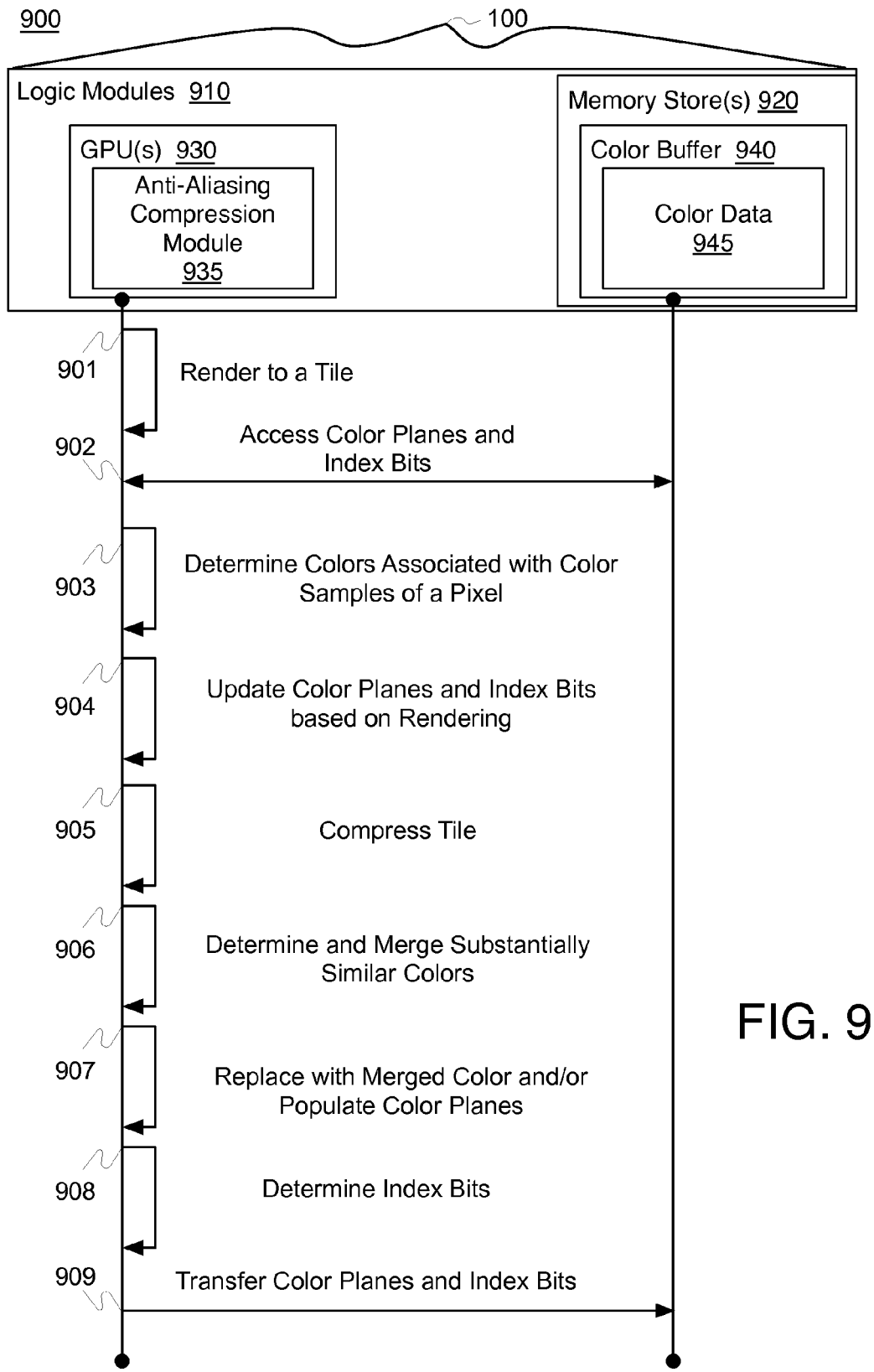
FIG. 9 is an illustrative diagram of an example graphics rendering process in operation.

FIG. 9 is an illustrative diagram of example system 100 and process 900 for providing anti-aliasing in graphics rendering, arranged in accordance with at least some implementations of the present disclosure. In the illustrated implementation, process 900 may include one or more operations, functions or actions as illustrated by one or more of actions 901, 902, 903, 904, 905, 906, 907, 908 and/or 909. By way of non-limiting example, process 900 also will be described herein with reference to example video coding system 100 of FIG. 10, as is described herein below.

In the illustrated implementation, system 100 may include logic modules 910, the like, and/or combinations thereof. For example, modules 910, may include memory store(s) 920, graphics processing unit(s) 930, which may include anti-aliasing compression module 935, and color buffer 940, the like, and/or combinations thereof.

Anti-aliasing compression module 935 may be configured to determine two or more colors associated with a plurality of color samples of a pixel, as described herein. Anti-aliasing compression module 935 may also be configured to determine a first color of the two or more colors and a second color of the two or more colors may be substantially similar and/or merge the first color and the second color to form a merged color. Anti-aliasing compression module 935 may be configured to replace the first color and/or the second color with the merged color and/or populate a color plane with the merged color such that the merged color is associated with the pixel. As shown, anti-aliasing compression module 935 may also be configured to render to a tile, access a color plane or planes and/or index bits, compress a tile, and/or transfer color data 945 to color buffer 940 such that color data 945 includes the populated color plane.

Process 900 may be utilized as a computer-implemented method for providing anti-aliasing in graphics rendering. Process 900 may begin at block 901, "Render to a Tile", where a tile of pixels may be rendered. The tile may be rendered using any suitable techniques and may generate a tile of pixels having multiple samples (e.g., color samples) as discussed herein. The rendering may be based on any suitable data such as image data, model, models, or model data, scene data, vector data, raster data, or the like.

Processing may continue from operation 901 to operation 902, "Access Color Planes and Index Bits", where anti-aliasing compression module 935 may access color planes and index bits via color buffer 940 of memory stores 920. The color planes and index bits may contain any data as discussed herein (either compressed or uncompressed). In some examples, the data may include color samples for various pixels of a tile as discussed herein.

Processing may continue from operation 902 to operation 903, "Determine Colors Associated with Color Samples of a Pixel", where two or more colors associated with a plurality of color samples of a pixel may be determined Colors associated with color samples 303-1 through 303-4 of pixel 302 may be determined, for example. The colors may be determined by anti-aliasing compression module 935 of graphics processing unit or units 930 based on the rendering, for example. For example, individual pixels may include two or more color samples within the individual pixels and the determined colors may be associated with the two or more color samples, as discussed above.

Processing may continue from operation 903 to operation 904, "Update Color Planes and Index Bits based on Rendering", where the one or more accessed color planes may be updated based on the rendering. In some examples, the one or more accessed color planes may be updated to the one or more populated color planes, as discussed herein. Further, index bits may be updated at operation 904. For example, index bits for individual pixels of a tile of pixels may be determined as described herein.

Processing may continue from operation 904 to operation 905, "Compress Tile", where the updated tile of pixels may be compressed. In some examples, a compression determination may be made. If it is determined a compression may be advantageous (for example, based on the color data in a plane or based on meeting a cache line threshold or the like), the updated tile of pixels may be compressed as discussed herein. As discussed, in various examples, a compression may be performed by merging substantially similar colors as discussed herein. In various examples, tile compression may be performed after a cache evict or the like.

Processing may continue from operation 905 to operation 906, "Determine and Merge Substantially Similar Colors", where it may be determined that a first color of the two or more colors and a second color of the two or more colors may be substantially similar. For example, the determination that the colors may be substantially similar may be based on a distance between the colors and comparison of the distance to a threshold, as discussed above, or based on any other technique discussed herein. Further as discussed herein, in some examples, the substantially similar colors may include two colors while in other examples, the substantially similar colors may include more than two colors. Further, at operation 906, the substantially similar colors (e.g., the first color and the second color) may be merged to form a merged color. The substantially similar colors may be merged as described with respect to equation (3) and weighted averaging techniques as discussed herein.

Processing may continue from operation 906 to operation 907, "Replace with Merged Color and/or Populate Color Planes", where the first color and the second color may be replaced with the merged color as discussed herein. Furthermore, at operation 906, a color plane may be populated with the merged color such that the merged color is associated with the pixel.

Processing may continue from operation 907 to operation 908, "Determine Index Bits", where index bits associated with the pixel may be determined. For example, index bits associated with bit combinations 105, 205, 315, 415, 515, 615, or 715 or the like may be determined. As discussed, in some examples, index bits 00 may indicate color plane 0, index bits 01 may indicate color plane 1, index bits 10 may indicate color plane 2, and index bits 11 may indicate color plane 3, although any suitable index bits and/or bit combinations may be used.

Processing may continue from operation 908 to operation 909, "Transfer Color Data", where color data 845 including the populated color plane and/or the determined index bits may be transferred by graphics processing unit(s) 830 to color buffer 840, which may receive and store color data 845.

In general, process 900 may be repeated any number of times either in serial or in parallel, as needed. Further, in general, anti-aliasing compression module 935 may be implemented via hardware, software, and or firmware. As shown, in some implementations, anti-aliasing compression module 935 may be implemented via graphics processing unit(s) 930. In other implementations, anti-aliasing compression module 935 may be implemented via software implemented via one or more central processing unit(s). In general, anti-aliasing compression module 935 and/or the operations discussed herein may be enabled or enabled at a system or user level, for example.

While implementation of example processes 800, 900, and other processes discussed herein may include the undertaking of all blocks shown in the order illustrated, the present disclosure is not limited in this regard and, in various examples, implementation of the processes may include the undertaking only a subset of the blocks shown and/or in a different order than illustrated.

In addition, any one or more of the blocks or operations discussed herein (such as the operations illustrated and discussed with respect to FIGS. 1-9) may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks or operations discussed herein.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As discussed, the described techniques may save substantial memory bandwidth. For example, imagine a tessellated sphere with two thousand triangles such that a thousand of the triangles may be visible on a front side during rendering. Such an example gives rise to many edges in the tiles inside the silhouette edge of the sphere (e.g., inner edges). All or most of the inner edges may be merged using the described techniques and the resultant rendering will actually be the same as or substantially similar to as the previous MSAA algorithms results. In general, only the silhouette edges will increase memory bandwidth, assuming that the background color is substantially different from the sphere color. If that they are not substantially different, then the silhouette edges may be merged using the described techniques and fewer color planes may be used. This result may be desirable since no anti-aliasing effect will be seen on such edges since the background and the color sphere have similar color.

Further, as discussed, if a tile of pixels is managed such that the tile uses only plane 0 (which will be much more frequent using the described techniques), then during subsequent processing, the higher level planes do not need to be resolved since that has already been done as part of the pixel merge. Therefore, the described techniques may also save processing time and power, for example.

Figure 10:
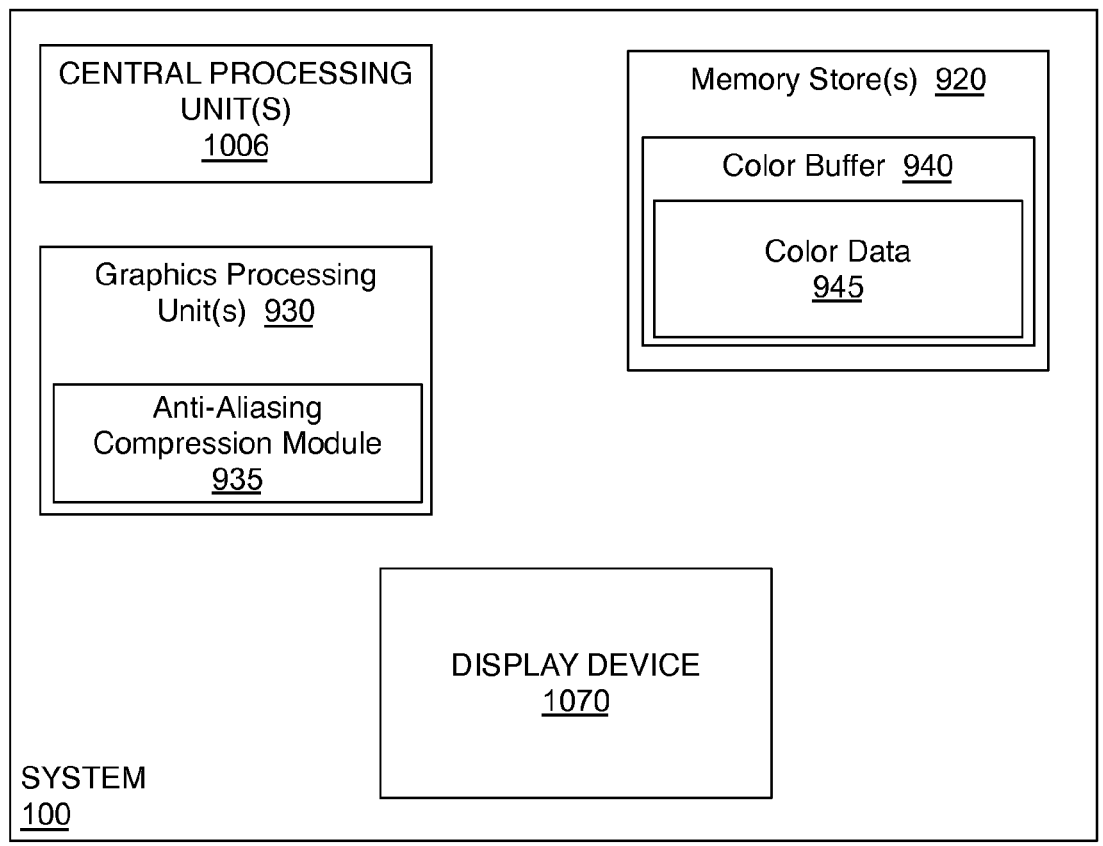
FIG. 10 is an illustrative diagram of an example system for providing graphics rendering.

FIG. 10 is an illustrative diagram of an example system 100 for providing graphics rendering, arranged in accordance with at least some implementations of the present disclosure. In the illustrated implementation, system 100 may include one or more central processing units 1006, one or more memory stores 920, one or more graphics processing units 930, color buffer 940 and/or a display device 1070. Central processing units 1006, memory store 920, graphics processing units 930, buffer 940, and/or display device 1070 may be capable of communication with one another, via, for example, a bus or other access. In various implementations, display device 1070 may be integrated in system 100 or implemented separately from system 100.

As shown in FIG. 10, and discussed above, anti-aliasing compression module 935 may be implemented via graphics processing units 930. In other examples, anti-aliasing compression module 935 may be implanted via central processing units 1006. As shown, graphics processing unit 930 may include anti-aliasing compression module 935. Graphics processing unit 930 may be communicatively coupled to color buffer 940. Anti-aliasing compression module 935 may be configured to determine two or more colors associated with a plurality of color samples of a pixel, determine a first color of the two or more colors and a second color of the two or more colors are substantially similar, merge the first color and the second color to form a merged color, replace the first color and the second color with the merged color, populate a color plane with the merged color such that the merged color is associated with the pixel, and transfer color data 945 to color buffer 940 such that color data 945 includes the populated color plane. In general, memory stores 920 may be communicatively coupled to graphics processing unit 930. Furthermore, display device 1070 may be configured to display output image data (not shown) based at least in part on color data 945. Anti-aliasing compression module 935 may be further configured to render a tile comprising the pixel, access one or more color planes via a color buffer, update the one or more color planes based on the rendering, and or determine index bits associated with the first pixel.

As will be appreciated, the modules illustrated in FIG. 10 may include a variety of software and/or hardware modules and/or modules that may be implemented via software and/or hardware. For example, the modules may be implemented as software via central processing units 1006 and/or graphics processing units 930 or the modules may be implemented via a dedicated hardware portion or portions of graphics processing units 930. Further, the shown memory stores 920 may be shared memory for central processing units 1006 and/or graphics processing units 930, for example. Further, color buffer 940 may be implemented together with or separately from memory stores 920 and/or color buffer may be implemented via a general buffer that may include other buffer portions such as a render buffer, or the like. Also, system 100 may be implemented in a variety of ways. For example, system 100 (excluding display device 1070) may be implemented as a single chip or device having a graphics processor, a quad-core central processing unit, on-board cache, and a memory controller input/output (I/O) module (not shown). In other examples, system 100 (again excluding display device 1070) may be implemented as a chipset.

Central processing units 1006 may include any suitable implementation including, for example, microprocessor(s), multicore processors, application specific integrated circuits, chip(s), chipsets, or the like. Further, graphics processing units 930 may include any suitable implementation including, for example, processor(s), multicore processors, application specific integrated circuits, programmable logic devices, graphics cards, integrated graphics, general purpose graphics processing unit(s), or the like. In addition, memory stores 920 and/or color buffer 940 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 920 and/or color buffer 940 may be implemented via cache memory. In various examples, system 100 may be implemented as a chipset or as a system on a chip.

Figure 11:
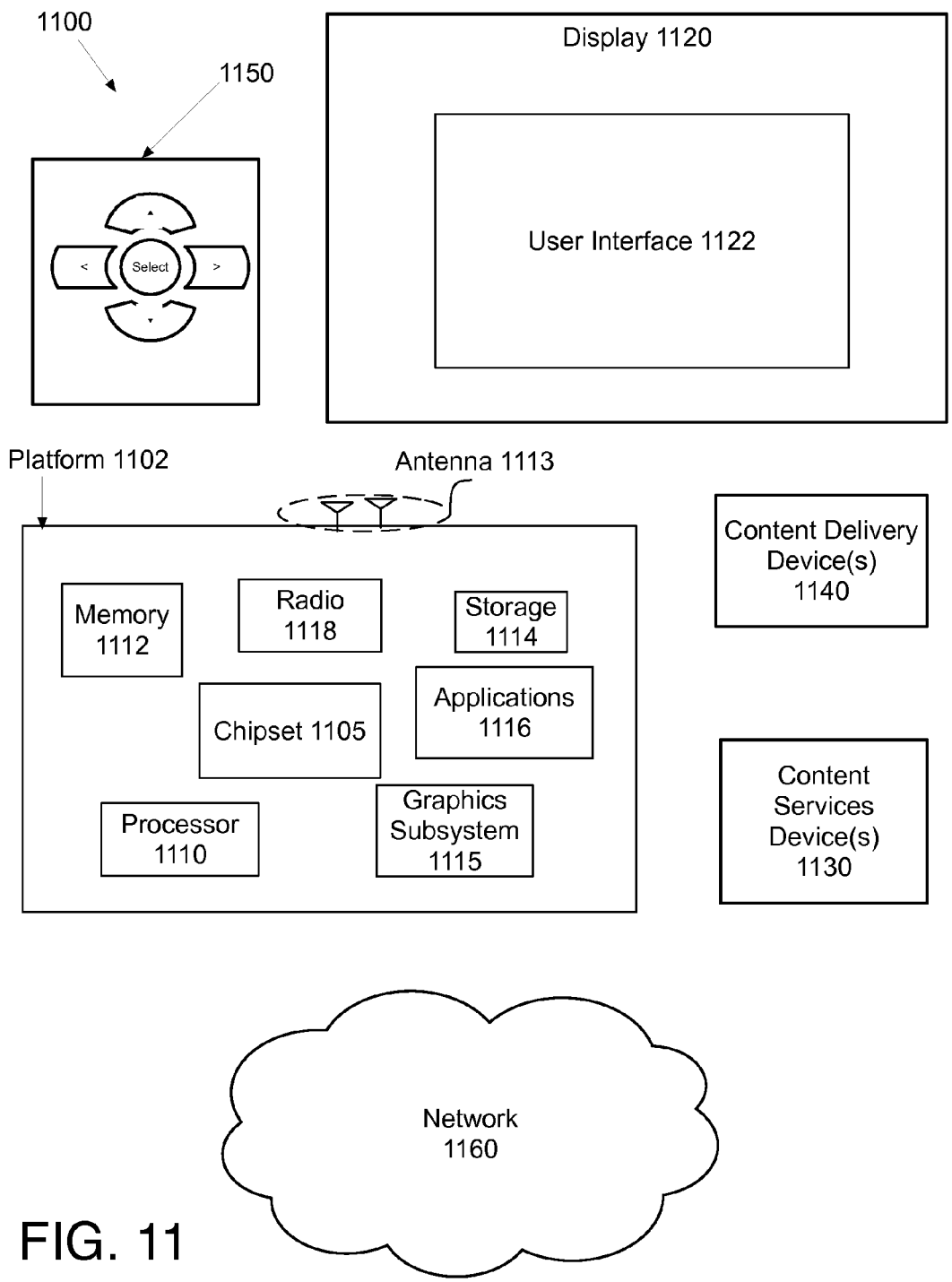
FIG. 11 is an illustrative diagram of an example system.

FIG. 11 illustrates an example system 1100 in accordance with the present disclosure. In various implementations, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In embodiments, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off" In addition, chipset 1105 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas 1113, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
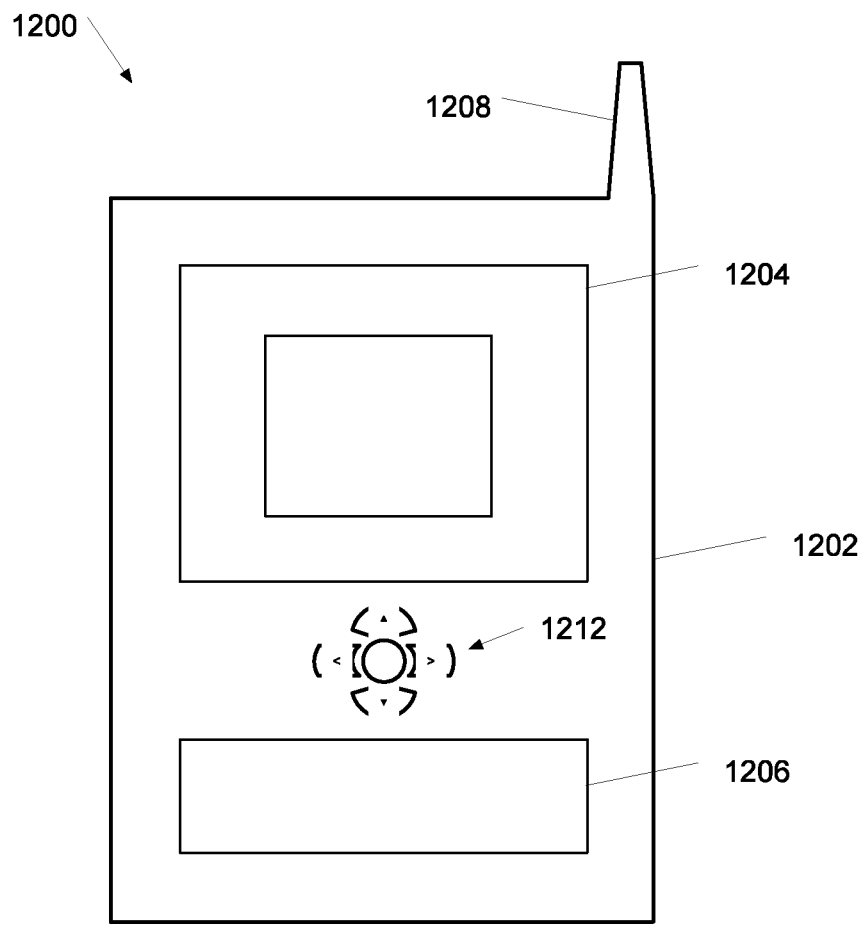
FIG. 12 illustrates an example device, all arranged in accordance with at least some implementations of the present disclosure.

As described above, system 1200 may be embodied in varying physical styles or form factors. FIG. 12 illustrates implementations of a small form factor device 1200 in which system 1200 may be embodied. In embodiments, for example, device 1200 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing 1202, a display 1204, an input/output (I/O) device 1206, and an antenna 1208. Device 1200 also may include navigation features 1212. Display 1204 may include any suitable display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 1200 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for providing anti-aliasing in graphics rendering may include determining two or more colors associated with a plurality of color samples of a pixel, determining a first color of the two or more colors and a second color of the two or more colors are substantially similar, merging the first color and the second color to form a merged color, and replacing the first color and the second color with the merged color.

In a further example of a computer-implemented method for providing anti-aliasing in graphics rendering, a color plane may be populated with the merged color such that the merged color is associated with the pixel, a tile including the pixel may be rendered, one or more color planes may be accessed via a color buffer, the one or more color planes may be updated based on the rendering, color data including the populated color plane may be transferred to a color buffer, index bits associated with the first pixel may be determined, a second color plane may be populated with a third color such that the two or more colors associated with the plurality of color samples include at least the first color, the second color, and the third color, the third color is not substantially similar to the first color, the third color is less similar to the first color than the second color, or the second color qualified as a substantially similar color prior to evaluation of the third color, and such that the first color plane includes color plane 0 and the second color plane comprises color plane 1, determining the first color and a third color of the two or more colors are substantially similar such that merging the first color and the second color to form the merged color includes merging the first color, the second color, and the third color to form the merged color, determining the merged color and a third color of the two or more colors are substantially similar such that merging the first color and the second color to form the merged color includes merging the first color, the second color, and the third color to form the merged color, and determining a first depth associated with a first sample of the plurality of color samples and a second depth associated with a second sample of the plurality of color samples is less than a depth threshold such that the first sample is associated with the first color and the second color sample is associated with the second color. The first color may be associated with a first triangle overlapping the pixel, the second color may be associated with a second triangle overlapping the pixel, and the boundary between the first triangle and the second triangle may be at least one of an inner boundary or a silhouette boundary. Determining the first color and the second color are substantially similar may include comparing the first color to each of the other colors of the two or more colors to determine a plurality of distances associated with each of the other colors of the two or more colors such that a distance associated with the second color of the two or more colors may be a minimum distance of the plurality of distances, and the distance associated with the second color of the two or more colors may be less than a threshold. Determining the first color and the second color are substantially similar may include comparing the first color to each of the other colors of the two or more colors in order to determine a plurality of distances associated with the other colors of the two or more colors such that a distance associated with the second color of the two or more colors may be a first distance to be less than a threshold. Determining the first color and the second color are substantially similar may include determining a distance between the first color and the second color and comparing the distance to a threshold such that, if the distance is less than the threshold, the first color and the second color are substantially similar and, if the distance is greater than or equal to the threshold, the first color and the second color are not substantially similar. The distance may be determined based on a distance function comprising at least one of a real distance between colors in (red green blue) RGB color space, a real distance between colors in (red green blue alpha) RGBA color space, or a sum of absolute differences between color components. The threshold may include at least one of a predetermined threshold or a heuristically determined threshold. The threshold may include at least one of 4, 5, or 9. Determining the first color and the second color are substantially similar may include determining the first color comprises a color of a first triangle and the second color comprises a color of a second triangle such that the first triangle and the second triangle share a triangle edge. A first subset of the plurality of color samples may be associated with the first color and a second subset of the plurality of color samples may be associated with the second color such that the first subset may be a first percentage of the plurality of color samples and the second subset may be a second percentage of the plurality of color samples, and merging the first color and the second color to form the merged color may include merging the first percentage of the first color and the second percentage of the second color. The two or more colors may include only two colors, the first color and the second color, the color plane may be color plane 0 and no other color plane may be populated for the pixel. The pixel may include a first pixel of a tile of a plurality of pixels The tile may be 8 pixels wide by 4 pixels high. Each pixel of the tile of pixels may include four color samples. The color plane may be one color plane of four available color planes. Each bit combination may include 8 bits.

In another example, a system for providing anti-aliasing in graphics rendering on a computer may include a color buffer and a graphics processing unit. The graphics processing unit may include an anti-aliasing compression module. The graphics processing unit may be communicatively coupled to the color buffer and the anti-aliasing compression module may be configured to determine two or more colors associated with a plurality of color samples of a pixel, determine a first color of the two or more colors and a second color of the two or more colors are substantially similar, merge the first color and the second color to form a merged color, replace the first color and the second color with the merged color, populate a color plane with the merged color such that the merged color may be associated with the pixel, and transfer color data to the color buffer such that the color data includes the populated color plane.

In a further example of a system for providing anti-aliasing in graphics rendering on a computer, the system may include a display device. The display device may be configured to display output image data based at least in part on the color data. The anti-aliasing compression module may be further configured to render a tile including the pixel, access one or more color planes via a color buffer, update the one or more color planes based on the rendering, determine index bits associated with the first pixel, populate a second color plane with a third color such that the two or more colors associated with the plurality of color samples may include at least the first color, the second color, and the third color, the third color may not be substantially similar to the first color, the third color may be less similar to the first color than the second color, or the second color may have qualified as a substantially similar color prior to evaluation of the third color, and the first color plane comprises color plane 0 and the second color plane comprises color plane 1, determine the first color and a third color of the two or more colors may be substantially similar such that merging the first color and the second color to form the merged color may include merging the first color, the second color, and the third color to form the merged color, determine the merged color and a third color of the two or more colors may be substantially similar such that merging the first color and the second color to form the merged color may include merging the first color, the second color, and the third color to form the merged color, and determine a first depth associated with a first sample of the plurality of color samples and a second depth associated with a second sample of the plurality of color samples may be less than a depth threshold such that the first sample may be associated with the first color and the second color sample may be associated with the second color. The first color may be associated with a first triangle overlapping the pixel, the second color may be associated with a second triangle overlapping the pixel, and the boundary between the first triangle and the second triangle may be at least one of an inner boundary or a silhouette boundary. Determination that the first color and the second color are substantially similar may include comparing the first color to each of the other colors of the two or more colors to determine a plurality of distances associated with each of the other colors of the two or more colors such that a distance associated with the second color of the two or more colors may be a minimum distance of the plurality of distances, and the distance associated with the second color of the two or more colors may be less than a threshold. Determination that the first color and the second color are substantially similar may include comparing the first color to each of the other colors of the two or more colors in order to determine a plurality of distances associated with the other colors of the two or more colors such that a distance associated with the second color of the two or more colors may be a first distance to be less than a threshold. Determination that the first color and the second color are substantially similar may include determining a distance between the first color and the second color and comparing the distance to a threshold such that, if the distance is less than the threshold, the first color and the second color are substantially similar and, if the distance is greater than or equal to the threshold, the first color and the second color are not substantially similar. The distance may be determined based on a distance function comprising at least one of a real distance between colors in (red green blue) RGB color space, a real distance between colors in (red green blue alpha) RGBA color space, or a sum of absolute differences between color components. The threshold may include at least one of a predetermined threshold or a heuristically determined threshold. The threshold may include at least one of 4, 5, or 9. Determination that the first color and the second color are substantially similar may include determining the first color comprises a color of a first triangle and the second color comprises a color of a second triangle, wherein the first triangle and the second triangle share a triangle edge, A first subset of the plurality of color samples may be associated with the first color and a second subset of the plurality of color samples may be associated with the second color such that the first subset may be a first percentage of the plurality of color samples and the second subset may be a second percentage of the plurality of color samples, and merging the first color and the second color to form the merged color may include merging the first percentage of the first color and the second percentage of the second color. The two or more colors may include only two colors, the first color and the second color, the color plane may be color plane 0 and no other color plane may be populated for the pixel. The pixel may include a first pixel of a tile of a plurality of pixels The tile may be 8 pixels wide by 4 pixels high. Each pixel of the tile of pixels may include four color samples. The color plane may be one color plane of four available color planes. Each bit combination may include 8 bits.

In a further example, at least one machine readable medium may include a plurality of instructions that in response to being executed on a computing device, cause the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for providing anti-aliasing in graphics rendering comprising:
   determining, via an anti-aliasing compression module of a graphics processing unit, two or more colors associated with a plurality of color samples of a pixel;
   determining, via the anti-aliasing compression module, a first color of the two or more colors and a second color of the two or more colors are substantially similar based at least in part on a threshold;
   merging, via the anti-aliasing compression module, the first color and the second color to form a merged color based at least in part on the determination of substantial similarity of color;
   and replacing, via the anti-aliasing compression module, the first color and the second color with the merged color thereby providing an anti-aliased graphics rendering.

2. The method of claim 1, further comprising:
   populating a color plane with the merged color, wherein the merged color is associated with the pixel.

3. The method of claim 1, wherein determining the first color and the second color are substantially similar comprises determining a distance between the first color and the second color and comparing the distance to the threshold.

4. The method of claim 1, wherein determining the first color and the second color are substantially similar comprises comparing the first color to each of the other colors of the two or more colors to determine a plurality of distances associated with each of the other colors of the two or more colors, wherein a distance associated with the second color of the two or more colors is a minimum distance of the plurality of distances, and wherein the distance associated with the second color of the two or more colors is less than the threshold.

5. The method of claim 1, wherein determining the first color and the second color are substantially similar comprises comparing the first color to each of the other colors of the two or more colors in order to determine a plurality of distances associated with the other colors of the two or more colors, and wherein a distance associated with the second color of the two or more colors is a first distance to be less than the threshold.

6. The method of claim 1, wherein a first subset of the plurality of color samples are associated with the first color and a second subset of the plurality of color samples are associated with the second color, wherein the first subset is a first percentage of the plurality of color samples and the second subset is a second percentage of the plurality of color samples, and wherein merging the first color and the second color to form the merged color comprises merging the first percentage of the first color and the second percentage of the second color.

7. The method of claim 1, wherein the two or more colors comprise only two colors, the first color and the second color, wherein the color plane comprises color plane 0, and wherein no other color plane is populated for the pixel.

8. The method of claim 1, further comprising:
   determining the first color and a third color of the two or more colors are substantially similar, wherein merging the first color and the second color to form the merged color comprises merging the first color, the second color, and the third color to form the merged color.

9. The method of claim 1, wherein determining the first color and the second color are substantially similar comprises determining the first color comprises a color of a first triangle and the second color comprises a color of a second triangle, wherein the first triangle and the second triangle share a triangle edge.

10. The method of claim 1, further comprising:
    transferring color data comprising the populated color plane to a color buffer.

11. The method of claim 1, further comprising:
    populating a color plane with the merged color, wherein the merged color is associated with the pixel;
    rendering a tile comprising the pixel;
    accessing one or more color planes via a color buffer;
    updating the one or more color planes based on the rendering;
    transferring color data comprising the populated color plane to a color buffer;
    determining index bits associated with the first pixel;
    populating a second color plane with a third color, wherein the two or more colors associated with the plurality of color samples comprise at least the first color, the second color, and the third color, wherein the third color is not substantially similar to the first color, the third color is less similar to the first color than the second color, or the second color qualified as a substantially similar color prior to evaluation of the third color, and wherein the first color plane comprises color plane 0 and the second color plane comprises color plane 1;
    determining the first color and a third color of the two or more colors are substantially similar, wherein merging the first color and the second color to form the merged color comprises merging the first color, the second color, and the third color to form the merged color;
    determining the merged color and a third color of the two or more colors are substantially similar, wherein merging the first color and the second color to form the merged color comprises merging the first color, the second color, and the third color to form the merged color; and
    determining a difference between a first depth associated with a first sample of the plurality of color samples and a second depth associated with a second sample of the plurality of color samples is less than a depth threshold, wherein the first sample is associated with the first color and the second color sample is associated with the second color,
    wherein the first color is associated with a first triangle overlapping the pixel, wherein the second color is associated with a second triangle overlapping the pixel, and wherein the boundary between the first triangle and the second triangle is at least one of an inner boundary or a silhouette boundary,
    wherein determining the first color and the second color are substantially similar comprises comparing the first color to each of the other colors of the two or more colors to determine a plurality of distances associated with each of the other colors of the two or more colors, wherein a distance associated with the second color of the two or more colors is a minimum distance of the plurality of distances, and wherein the distance associated with the second color of the two or more colors is less than the threshold, wherein determining the first color and the second color are substantially similar comprises comparing the first color to each of the other colors of the two or more colors in order to determine a plurality of distances associated with the other colors of the two or more colors, and wherein a distance associated with the second color of the two or more colors is a first distance to be less than the threshold, wherein determining the first color and the second color are substantially similar comprises determining a distance between the first color and the second color and comparing the distance to the threshold, wherein, if the distance is less than the threshold, the first color and the second color are substantially similar and, if the distance is greater than or equal to the threshold, the first color and the second color are not substantially similar, wherein the distance is determined based on a distance function comprising at least one of a real distance between colors in (red green blue) RGB color space, a real distance between colors in (red green blue alpha) RGBA color space, or a sum of absolute differences between color components, wherein the threshold comprises at least one of a predetermined threshold or a heuristically determined threshold, and wherein the threshold comprises at least one of 4, 5, or 9, wherein determining the first color and the second color are substantially similar comprises determining the first color comprises a color of a first triangle and the second color comprises a color of a second triangle, wherein the first triangle and the second triangle share a triangle edge, wherein a first subset of the plurality of color samples are associated with the first color and a second subset of the plurality of color samples are associated with the second color, wherein the first subset is a first percentage of the plurality of color samples and the second subset is a second percentage of the plurality of color samples, and wherein merging the first color and the second color to form the merged color comprises merging the first percentage of the first color and the second percentage of the second color, wherein the two or more colors comprise only two colors, the first color and the second color, wherein the color plane comprises color plane 0, and wherein no other color plane is populated for the pixel, and wherein the pixel comprises a first pixel of a tile of a plurality of pixels, wherein the tile comprises 8 pixels wide by 4 pixels high, wherein each pixel of the tile of pixels comprises four color samples, and wherein the color plane comprise one color plane of four available color planes, and wherein each bit combination comprises 8 bits.

12. A system for providing anti-aliasing in graphics rendering on a computer, comprising:
a color buffer;
a graphics processing unit comprising an anti-aliasing compression module, wherein the graphics processing unit is communicatively coupled to the color buffer and wherein the anti-aliasing compression module is configured to:
determine two or more colors associated with a plurality of color samples of a pixel;
determine a first color of the two or more colors and a second color of the two or more colors are substantially similar based at least in part on a threshold;
merge the first color and the second color to form a merged color based at least in part on the determination of substantial similarity of color;
replace the first color and the second color with the merged color;
populate a color plane with the merged color, wherein the merged color is associated with the pixel; and
transfer color data to the color buffer, wherein the color data includes the populated color plane.

13. The system of claim 12, wherein determination that the first color and the second color are substantially similar comprises determining a distance between the first color and the second color and comparing the distance to the threshold, wherein, if the distance is less than the threshold, the first color and the second color are substantially similar and, if the distance is greater than or equal to the threshold, the first color and the second color are not substantially similar, wherein the distance is determined based on a distance function comprising at least one of a real distance between colors in (red green blue) RGB color space, a real distance between colors in (red green blue alpha) RGBA color space, or a sum of absolute differences between color components.

14. The system of claim 12, wherein determination that the first color and the second color are substantially similar comprises comparing the first color to each of the other colors of the two or more colors to determine a plurality of distances associated with each of the other colors of the two or more colors, wherein a distance associated with the second color of the two or more colors is a minimum distance of the plurality of distances, and wherein the distance associated with the second color of the two or more colors is less than the threshold.

15. The system of claim 12, wherein a first subset of the plurality of color samples are associated with the first color and a second subset of the plurality of color samples are associated with the second color, wherein the first subset is a first percentage of the plurality of color samples and the second subset is a second percentage of the plurality of color samples, and wherein the merging of the first color and the second color to form the merged color comprises merging the first percentage of the first color and the second percentage of the second color.

16. The system of claim 12, wherein the two or more colors comprise only two colors, the first color and the second color, wherein the color plane comprises color plane 0, and wherein no other color plane is populated for the pixel.

17. The system of claim 12, wherein the pixel comprises a first pixel of a tile of a plurality of pixels, wherein the tile comprises 8 pixels wide by 4 pixels high, wherein each pixel of the tile of pixels comprises four color samples, and wherein the color plane comprise one color plane of four available color planes, and wherein each bit combination comprises 8 bits.

18. The system of claim 12, further comprising:
a display device configured to display output image data based at least in part on the color data.

19. The system of claim 12, further comprising:
a display device configured to display output image data based at least in part on the color data,
wherein the anti-aliasing compression module is further configured to:
render a tile comprising the pixel;
access one or more color planes via a color buffer;
update the one or more color planes based on the rendering;

determine index bits associated with the first pixel;
populate a second color plane with a third color, wherein the two or more colors associated with the plurality of color samples comprise at least the first color, the second color, and the third color, wherein the third color is not substantially similar to the first color, the third color is less similar to the first color than the second color, or the second color qualified as a substantially similar color prior to evaluation of the third color, and wherein the first color plane comprises color plane 0 and the second color plane comprises color plane 1;
determine the first color and a third color of the two or more colors are substantially similar, wherein merging the first color and the second color to form the merged color comprises merging the first color, the second color, and the third color to form the merged color;
determine the merged color and a third color of the two or more colors are substantially similar, wherein merging the first color and the second color to form the merged color comprises merging the first color, the second color, and the third color to form the merged color; and
determine a difference between a first depth associated with a first sample of the plurality of color samples and a second depth associated with a second sample of the plurality of color samples is less than a depth threshold, wherein the first sample is associated with the first color and the second color sample is associated with the second color,
wherein the first color is associated with a first triangle overlapping the pixel, wherein the second color is associated with a second triangle overlapping the pixel, and wherein the boundary between the first triangle and the second triangle is at least one of an inner boundary or a silhouette boundary,
wherein determination that the first color and the second color are substantially similar comprises comparing the first color to each of the other colors of the two or more colors to determine a plurality of distances associated with each of the other colors of the two or more colors, wherein a distance associated with the second color of the two or more colors is a minimum distance of the plurality of distances, and wherein the distance associated with the second color of the two or more colors is less than the threshold,
wherein determination that the first color and the second color are substantially similar comprises comparing the first color to each of the other colors of the two or more colors in order to determine a plurality of distances associated with the other colors of the two or more colors, and wherein a distance associated with the second color of the two or more colors is a first distance to be less than the threshold,
wherein determination that the first color and the second color are substantially similar comprises determining a distance between the first color and the second color and comparing the distance to the threshold, wherein, if the distance is less than the threshold, the first color and the second color are substantially similar and, if the distance is greater than or equal to the threshold, the first color and the second color are not substantially similar, wherein the distance is determined based on a distance function comprising at least one of a real distance between colors in (red green blue) RGB color space, a real distance between colors in (red green blue alpha) RGBA color space, or a sum of absolute differences between color components, wherein the threshold comprises at least one of a predetermined threshold or a heuristically determined threshold, and wherein the threshold comprises at least one of 4, 5, or 9,
wherein determination that the first color and the second color are substantially similar comprises determining the first color comprises a color of a first triangle and the second color comprises a color of a second triangle, wherein the first triangle and the second triangle share a triangle edge,
wherein a first subset of the plurality of color samples are associated with the first color and a second subset of the plurality of color samples are associated with the second color, wherein the first subset is a first percentage of the plurality of color samples and the second subset is a second percentage of the plurality of color samples, and wherein the merging of the first color and the second color to form the merged color comprises merging the first percentage of the first color and the second percentage of the second color,
wherein the two or more colors comprise only two colors, the first color and the second color, wherein the color plane comprises color plane 0, and wherein no other color plane is populated for the pixel, and
wherein the pixel comprises a first pixel of a tile of a plurality of pixels, wherein the tile comprises 8 pixels wide by 4 pixels high, wherein each pixel of the tile of pixels comprises four color samples, and wherein the color plane comprise one color plane of four available color planes, and wherein each bit combination comprises 8 bits.

20. At least one non-transitory machine readable medium comprising a plurality of instructions that in response to being executed on a computing device, cause the computing device to provide anti-aliasing in graphics rendering by:
determining, via an anti-aliasing compression module associated with a graphics processing unit, two or more colors associated with a plurality of color samples of a pixel;
determining, via the anti-aliasing compression module, a first color of the two or more colors and a second color of the two or more colors are substantially similar;
merging, via the anti-aliasing compression module, the first color and the second color to form a merged color based at least in part on the determination of substantial similarity of color; and
replacing, via the anti-aliasing compression module, the first color and the second color with the merged color thereby providing an anti-aliased graphics rendering.

21. The non-transitory machine readable medium of claim 20, further comprising instructions that in response to being executed on the computing device, cause the computing device to provide anti-aliasing in graphics rendering by:
populating a color plane with the merged color, wherein the merged color is associated with the pixel.

22. The non-transitory machine readable medium of claim 20, wherein determining the first color and the second color are substantially similar comprises determining a distance between the first color and the second color and comparing the distance to the threshold, wherein, if the distance is less than the threshold, the first color and the second color are substantially similar and, if the distance is greater than or equal to the threshold, the first color and the second color are not substantially similar, wherein the distance is determined based on a distance function comprising at least one of a real distance between colors in (red green blue) RGB color space, a real distance between colors in (red green blue alpha) RGBA color space, or a sum of absolute differences between color components.

23. The non-transitory machine readable medium of claim 20, wherein a first subset of the plurality of color samples are associated with the first color and a second subset of the plurality of color samples are associated with the second color, wherein the first subset is a first percentage of the plurality of color samples and the second subset is a second percentage of the plurality of color samples, and wherein merging the first color and the second color to form the merged color comprises merging the first percentage of the first color and the second percentage of the second color.

24. The non-transitory machine readable medium of claim 20, wherein determining the first color and the second color are substantially similar comprises comparing the first color to each of the other colors of the two or more colors to determine a plurality of distances associated with each of the other colors of the two or more colors, wherein a distance associated with the second color of the two or more colors is a minimum distance of the plurality of distances, and wherein the distance associated with the second color of the two or more colors is less than the threshold.

25. The non-transitory machine readable medium of claim 20, further comprising instructions that in response to being executed on the computing device, cause the computing device to provide anti-aliasing in graphics rendering by:
populating a color plane with the merged color, wherein the merged color is associated with the pixel;
rendering a tile comprising the pixel;
accessing one or more color planes via a color buffer;
updating the one or more color planes based on the rendering;
transferring color data comprising the populated color plane to a color buffer;
determining index bits associated with the first pixel;
populating a second color plane with a third color, wherein the two or more colors associated with the plurality of color samples comprise at least the first color, the second color, and the third color, wherein the third color is not substantially similar to the first color, the third color is less similar to the first color than the second color, or the second color qualified as a substantially similar color prior to evaluation of the third color, and wherein the first color plane comprises color plane 0 and the second color plane comprises color plane 1;
determining the first color and a third color of the two or more colors are substantially similar, wherein merging the first color and the second color to form the merged color comprises merging the first color, the second color, and the third color to form the merged color;
determining the merged color and a third color of the two or more colors are substantially similar, wherein merging the first color and the second color to form the merged color comprises merging the first color, the second color, and the third color to form the merged color; and
determining a difference between a first depth associated with a first sample of the plurality of color samples and a second depth associated with a second sample of the plurality of color samples is less than a depth threshold, wherein the first sample is associated with the first color and the second color sample is associated with the second color,
wherein the first color is associated with a first triangle overlapping the pixel, wherein the second color is associated with a second triangle overlapping the pixel, and wherein the boundary between the first triangle and the second triangle is at least one of an inner boundary or a silhouette boundary,
wherein determining the first color and the second color are substantially similar comprises comparing the first color to each of the other colors of the two or more colors to determine a plurality of distances associated with each of the other colors of the two or more colors, wherein a distance associated with the second color of the two or more colors is a minimum distance of the plurality of distances, and wherein the distance associated with the second color of the two or more colors is less than the threshold,
wherein determining the first color and the second color are substantially similar comprises comparing the first color to each of the other colors of the two or more colors in order to determine a plurality of distances associated with the other colors of the two or more colors, and wherein a distance associated with the second color of the two or more colors is a first distance to be less than the threshold,
wherein determining the first color and the second color are substantially similar comprises determining a distance between the first color and the second color and comparing the distance to the threshold, wherein, if the distance is less than the threshold, the first color and the second color are substantially similar and, if the distance is greater than or equal to the threshold, the first color and the second color are not substantially similar, wherein the distance is determined based on a distance function comprising at least one of a real distance between colors in (red green blue) RGB color space, a real distance between colors in (red green blue alpha) RGBA color space, or a sum of absolute differences between color components, wherein the threshold comprises at least one of a predetermined threshold or a heuristically determined threshold, and wherein the threshold comprises at least one of 4, 5, or 9,
wherein determining the first color and the second color are substantially similar comprises determining the first color comprises a color of a first triangle and the second color comprises a color of a second triangle, wherein the first triangle and the second triangle share a triangle edge,
wherein a first subset of the plurality of color samples are associated with the first color and a second subset of the plurality of color samples are associated with the second color, wherein the first subset is a first percentage of the plurality of color samples and the second subset is a second percentage of the plurality of color samples, and wherein merging the first color and the second color to form the merged color comprises merging the first percentage of the first color and the second percentage of the second color,
wherein the two or more colors comprise only two colors, the first color and the second color, wherein the color plane comprises color plane 0, and wherein no other color plane is populated for the pixel, and
wherein the pixel comprises a first pixel of a tile of a plurality of pixels, wherein the tile comprises 8 pixels wide by 4 pixels high, wherein each pixel of the tile of pixels comprises four color samples, and wherein the color plane comprise one color plane of four available color planes, and wherein each bit combination comprises 8 bits.

* * * * *